(12) United States Patent
Asaoka

(10) Patent No.: US 11,340,577 B2
(45) Date of Patent: May 24, 2022

(54) LIGHT RADIATING DEVICE

(71) Applicant: OLYMPUS CORPORATION, Tokyo (JP)

(72) Inventor: Nobuyoshi Asaoka, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 342 days.

(21) Appl. No.: 16/523,521

(22) Filed: Jul. 26, 2019

(65) Prior Publication Data

US 2020/0050170 A1  Feb. 13, 2020

Related U.S. Application Data

(63) Continuation of application No. PCT/JP2017/002686, filed on Jan. 26, 2017.

(51) Int. Cl.

| | |
|---|---|
| *G01B 11/14* | (2006.01) |
| *G05B 19/402* | (2006.01) |
| *G01B 11/02* | (2006.01) |
| *G02B 7/02* | (2021.01) |

(52) U.S. Cl.
CPC .......... *G05B 19/402* (2013.01); *G01B 11/026* (2013.01); *G02B 7/023* (2013.01)

(58) Field of Classification Search
CPC ..... G01B 11/026; G01B 11/002; G01B 11/14; G01S 5/163; G01S 5/16
USPC .......................................................... 356/614
See application file for complete search history.

(56) References Cited

U.S. PATENT DOCUMENTS

| | | | |
|---|---|---|---|
| 2008/0117534 A1 | 5/2008 | Onuki et al. | |
| 2015/0062943 A1 | 3/2015 | Kaisha | |

FOREIGN PATENT DOCUMENTS

| | | | | |
|---|---|---|---|---|
| JP | 2003-156318 A | 5/2003 | | |
| JP | 2008-111891 A | 5/2008 | | |
| JP | 2011-014587 A | 1/2011 | | |
| JP | 5168643 B2 | * | 3/2013 | ......... G03G 15/5079 |
| JP | 2015-065144 A | 4/2015 | | |

OTHER PUBLICATIONS

International Search Report dated Apr. 25, 2017 issued in PCT/JP2017/002686.
English translation of International Preliminary Report on Patentability dated Aug. 8, 2019 together with the Written Opinion received in related International Application No. PCT/JP2017/002686.

* cited by examiner

*Primary Examiner* — Md M Rahman
(74) *Attorney, Agent, or Firm* — Scully, Scott, Murphy & Presser, P.C.

(57) ABSTRACT

A light radiating device includes an optical element held at a desired position by a holder and configured to exhibit desired optical performance based on incoming light entered at the desired position, a detector configured to detect an amount of positional deviation of the optical element relative to the desired position, and a discrimination unit configured to discriminate whether the light radiating device is in a normal state or an abnormal state based on the detected amount of positional deviation. The normal state is a state where the optical element exhibits the desired optical performance by being disposed at the desired position. The abnormal state is a state where the optical element is disposed at a position deviating from the desired position.

20 Claims, 16 Drawing Sheets

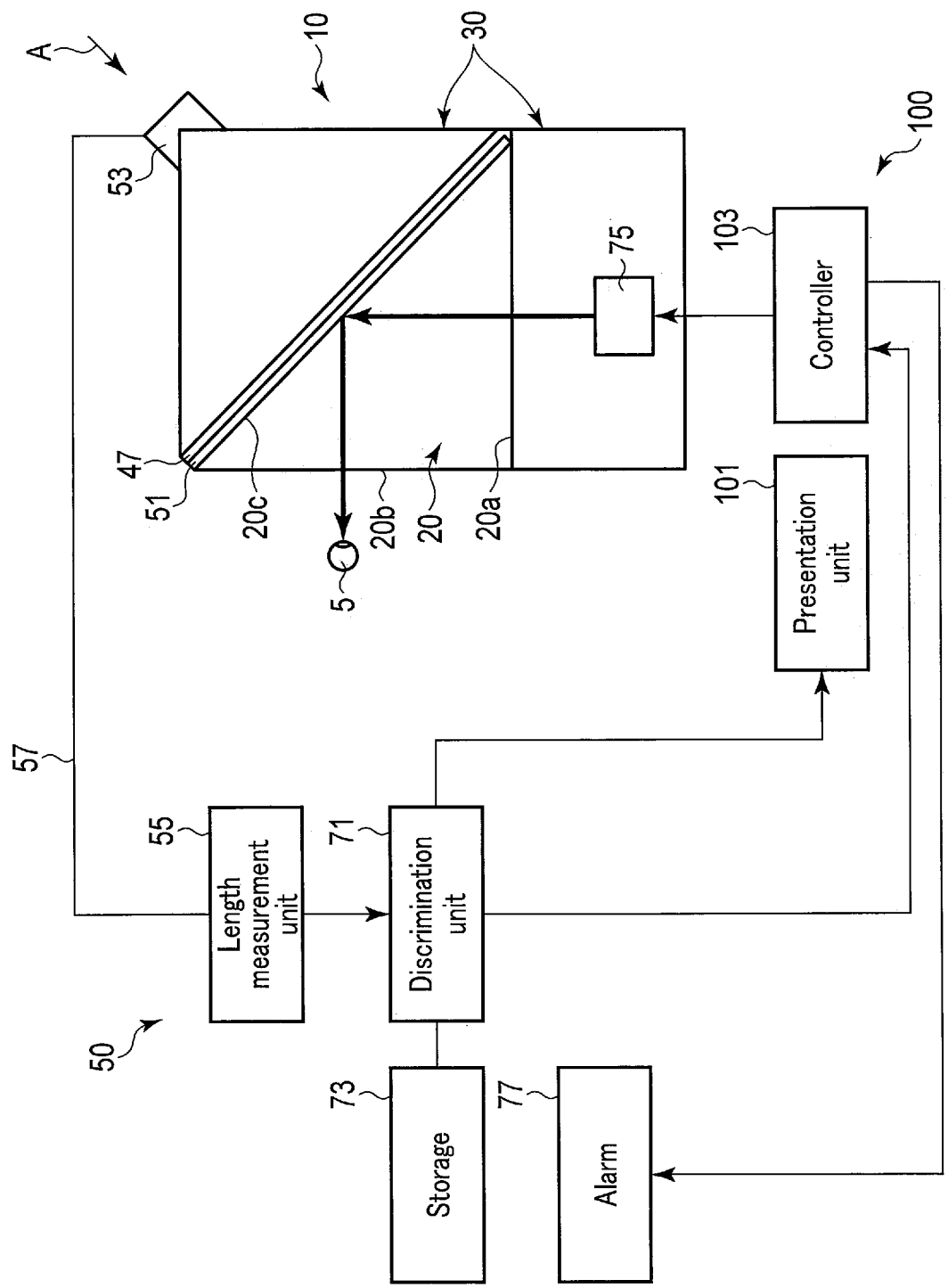
F I G. 1A

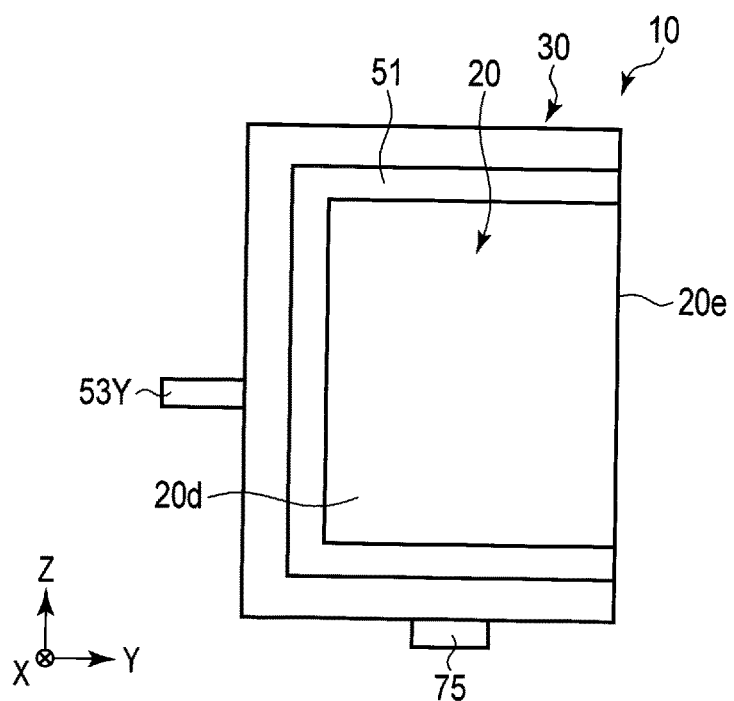
F I G. 2B
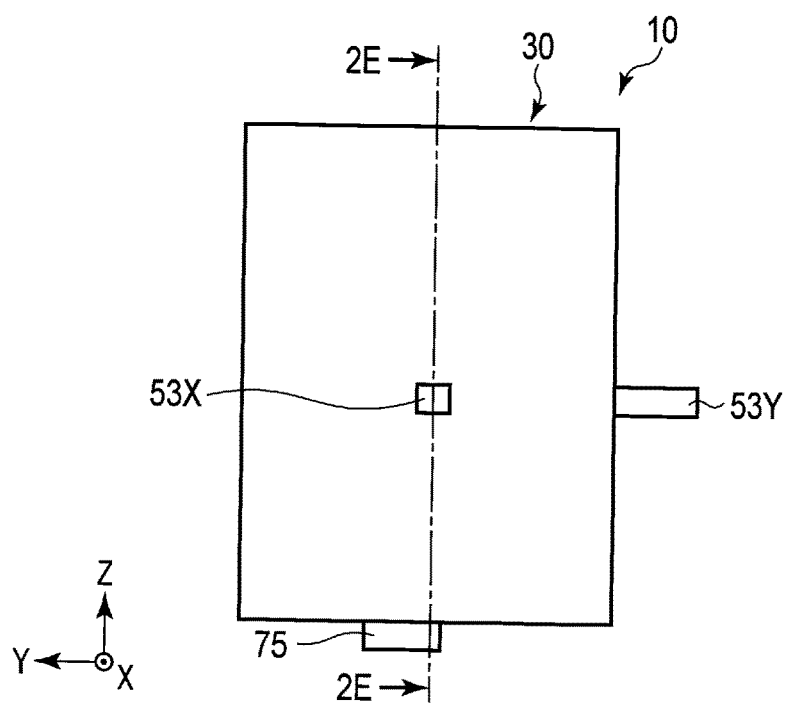
F I G. 2C

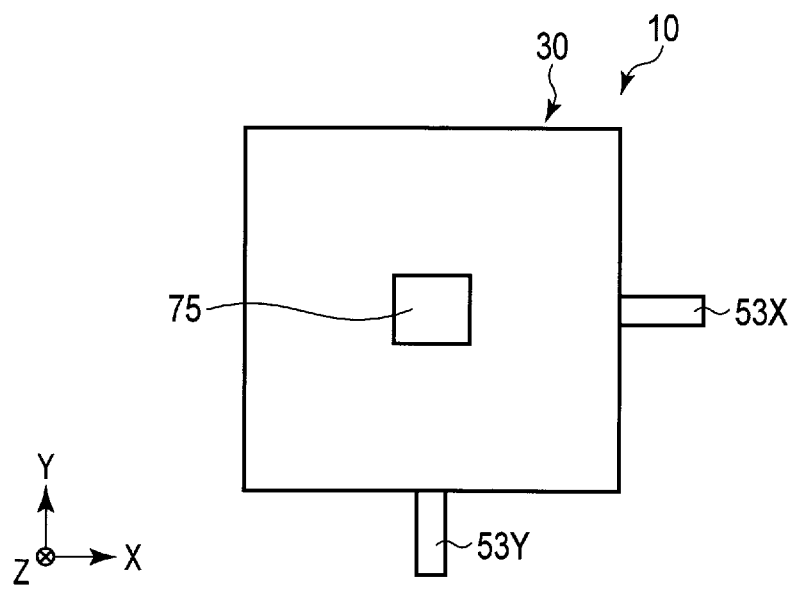
F I G. 2D
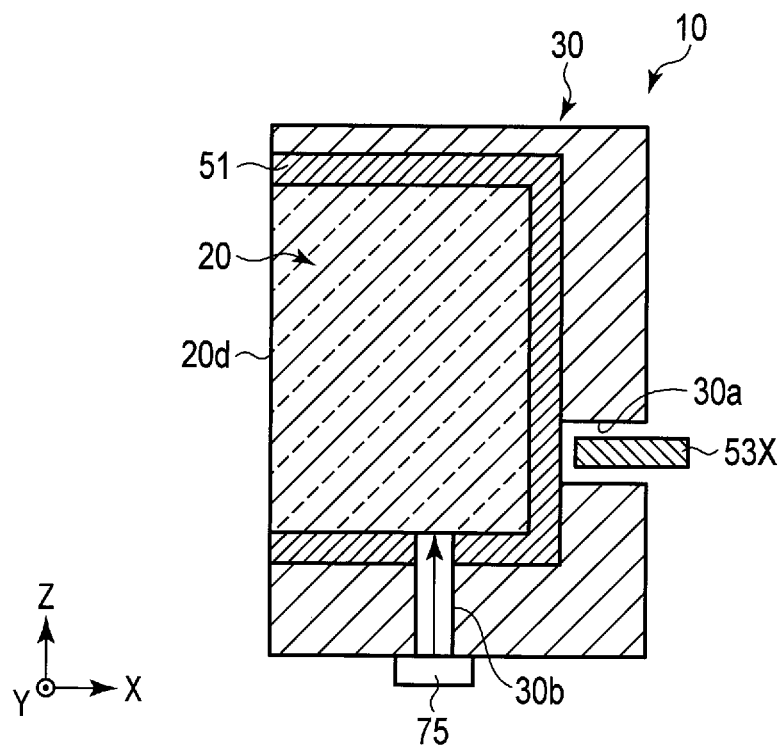
F I G. 2E

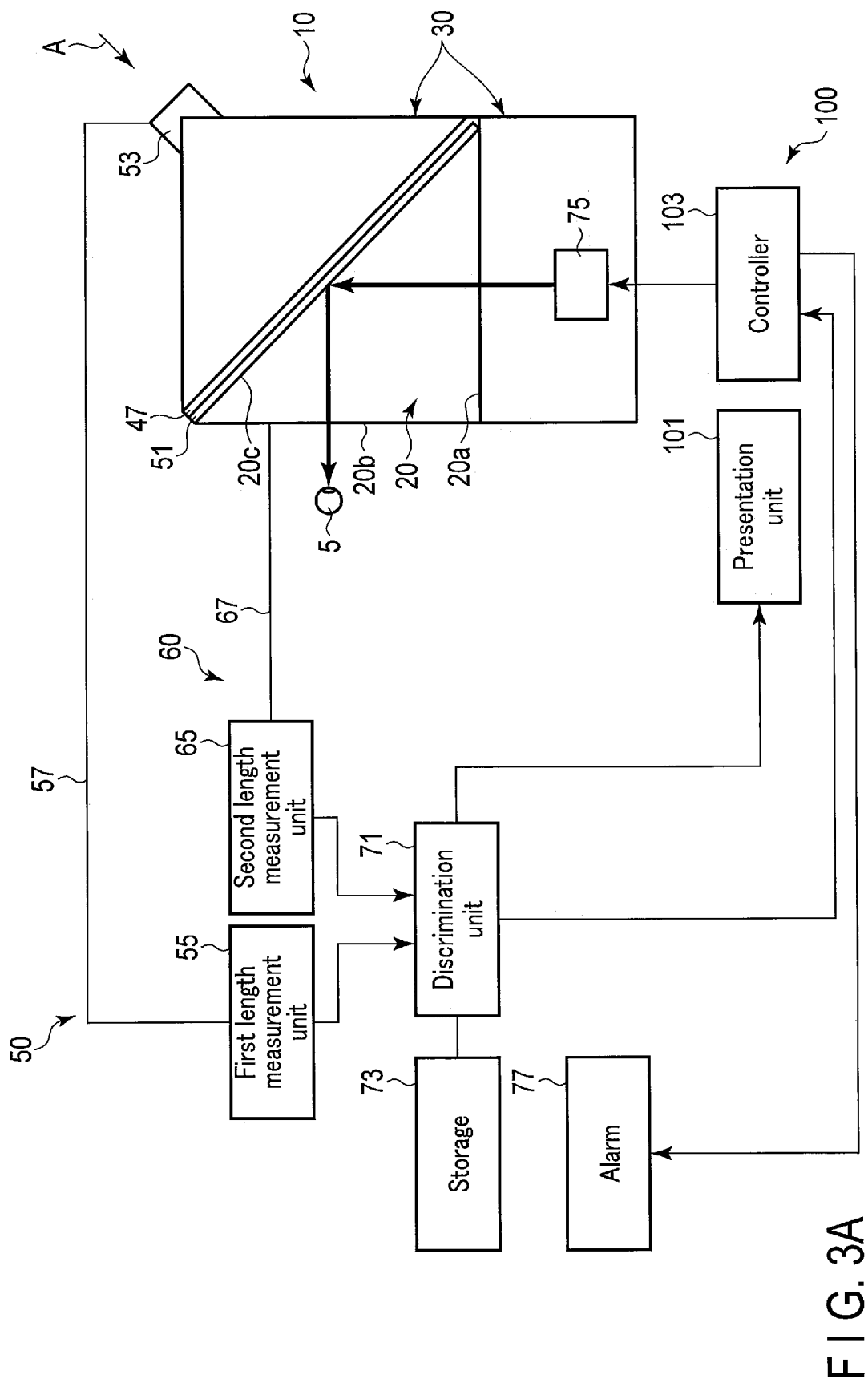
F I G. 3A

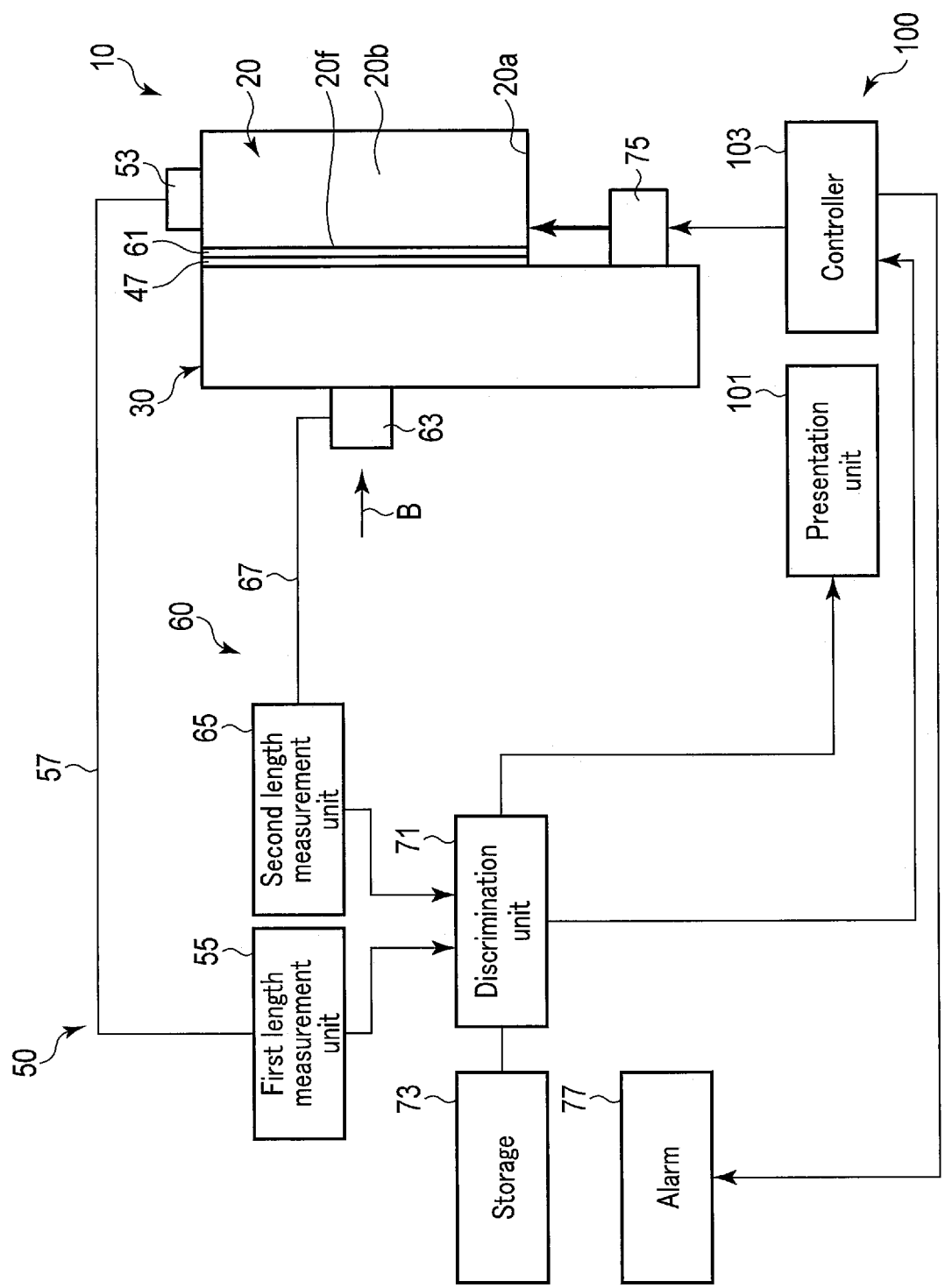
F I G. 3B

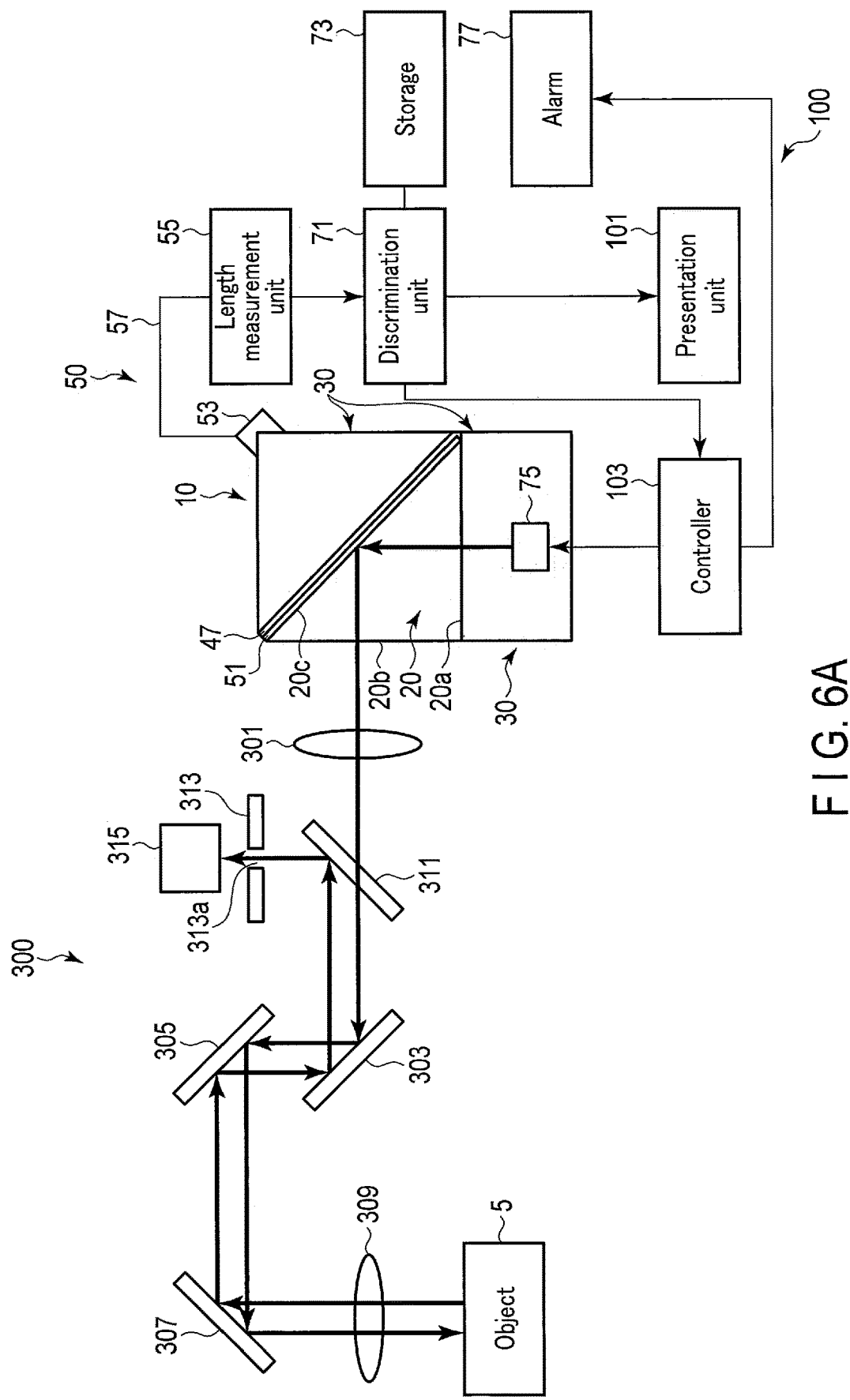
F I G. 6A

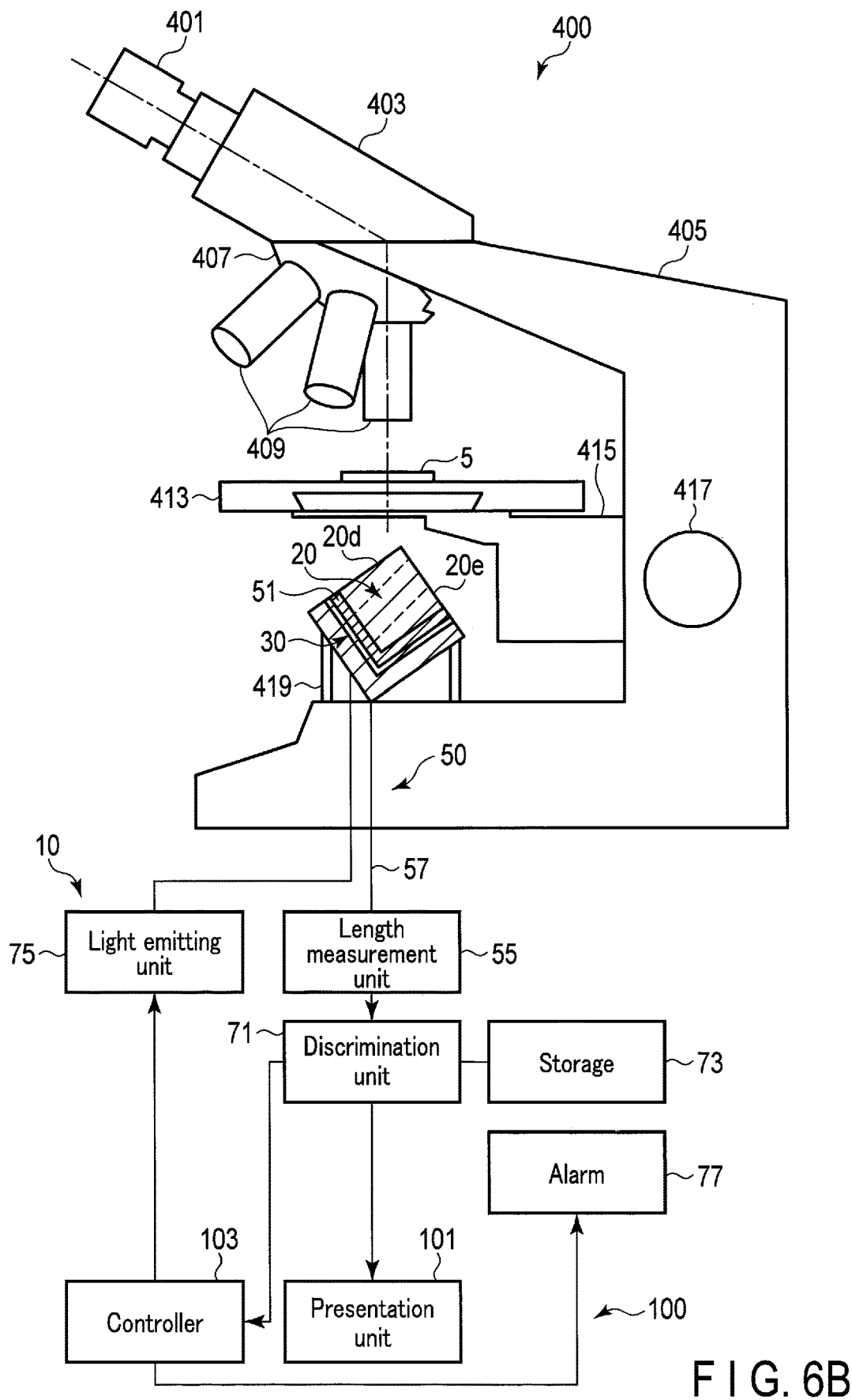
F I G. 6B

LIGHT RADIATING DEVICE

CROSS-REFERENCE TO RELATED APPLICATIONS

This application is a Continuation Application of PCT Application No. PCT/JP2017/002686, filed Jan. 26, 2017, the entire contents of which are incorporated herein by reference.

BACKGROUND OF THE INVENTION

1. Field of the Invention

The present invention relates to a light radiating device configured to radiate light.

2. Description of the Related Art

For example, Jpn. Pat. Appln. KOKAI Publication No. 2011-14587 discloses a light emitting device that brings light emitted from a semiconductor element to a wavelength converting member.

BRIEF SUMMARY OF THE INVENTION

A light radiating device according to the present invention includes an optical element held at a desired position by a holder and configured to exhibit desired optical performance based on incoming light entered at the desired position, a detector configured to detect an amount of positional deviation of the optical element relative to the desired position, and a discrimination unit configured to discriminate whether the light radiating device is in a normal state or an abnormal state based on the detected amount of positional deviation. The normal state is a state where the optical element exhibits the desired optical performance by being disposed at the desired position. The abnormal state is a state where the optical element is disposed at a position deviating from the desired position.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A is a schematic view of a light radiation system including a light radiating device according to a first embodiment of the present invention.

FIG. 2B is a left side view of the holder shown in FIG. 2A.

FIG. 2C is a right side view of the holder shown in FIG. 2A.

FIG. 2D is a bottom view of the holder shown in FIG. 2A.

FIG. 2E is a cross-sectional view taken along a line 2E-2E shown in FIG. 2C.

FIG. 3A is a schematic view of a light radiation system including a light radiating device according to a second embodiment of the present invention.

FIG. 3B is a schematic view of a light radiation system based on the left side view of the holder shown in FIG. 3A.

FIG. 6A shows a fifth embodiment of the present invention, and is a schematic view of a laser scanning microscope including the light radiation system.

FIG. 6B shows the fifth embodiment of the present invention, and is a schematic view of a transmission optical microscope including the light radiation system.

DETAILED DESCRIPTION OF THE INVENTION

Hereinafter, embodiments of the present invention will be described with reference to the figures. In some figures, the illustration of a part of a member is omitted for clarification of the illustration.

First Embodiment

A first embodiment of the present invention will be described below with reference to FIGS. 1A, 1B, 1C, and 1D.

Figure 1B:
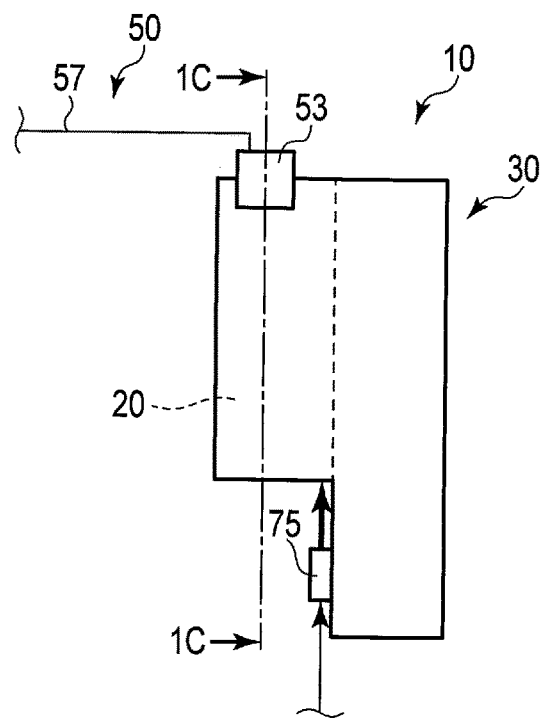
FIG. 1B is a right side view of a holder shown in FIG. 1A.

As shown in FIGS. 1A and 1B, a light radiating device 10 includes an optical element 20 that light emitted from a light emitting unit 75 enters as incoming light, and a holder 30 holding the light emitting unit 75 and the optical element 20. The light emitting unit 75 and the optical element 20 are held by the holder 30 so as to have a desired positional relationship with each other. In detail, the light emitting unit 75 and the optical element 20 are each held by the holder 30 at desired positions in the holder 30. The light emitting unit 75 is fixed to the holder 30 by an adhesive (not shown) and does not move relative to the holder 30. Similarly, the optical element 20 is fixed to the holder 30 by an adhesive 47 and basically does not move relative to the holder 30.

The light emitting unit 75 includes, for example, at least one of a laser light source configured to emit laser light, a light emitting diode configured to emit LED light, and a xenon lamp configured to emit lamp light. The laser light source includes, for example, a semiconductor laser device or a solid-state laser device.

The optical element 20 includes, for example, a one-surface reflective prism. The present embodiment is described assuming that the optical element 20 is a one-surface reflective prism. The optical element 20 has, for example, a triangular prism shape. The optical element 20 includes first and second side surfaces 20a and 20b that are orthogonal to each other and in contact with each other, and an inclined surface 20c that is inclined relative to the first and second side surfaces 20a and 20b and in contact with the first and second side surfaces 20a and 20b. Each of the first and second side surfaces 20a and 20b and the inclined surface 20c is, for example, a flat surface. For example, the optical element 20 is held by the holder 30 with a reflector 51 to be described later that is disposed on the inclined surface 20c being fixed to the holder 30 through an adhesive 47.

The optical element 20 reflects incoming light, which has entered the optical element 20 through the first side surface 20a, to the reflector 51 to be described later. The optical element 20 emits (radiates) incoming light toward the outside of the optical element 20 from the second side surface 20b. In this way, the optical element 20 reflects the incoming light traveling from the lower side of FIG. 1A toward the optical element 20 to the left side of FIG. 1A. The reflected light is emitted from the second side surface 20b of the optical element 20 to the outside of the optical element 20. The emitted outgoing light irradiates an object 5 (e.g., a scattering member) disposed outside the optical element 20.

The light emitting unit 75 and the optical element 20 are disposed on the holder 30 while maintaining a desired positional relationship with each other. At this time, in a state where the optical element 20 is held by the holder 30 at a desired position in the holder 30, the optical element 20 exhibits desired optical performance based on the incoming light that has entered. In detail, in the present embodiment, the optical element 20 has an optical performance of capable radiating outgoing light to a desired portion of the object 5. In other words, this optical performance indicates an emission position of the outgoing light emitted from the optical element 20. The optical performance of the optical element 20 has been shown by the emission position by way of example; however, the optical performance is not necessarily limited thereto. Examples of the optical performance of the optical element 20 include an emission position of outgoing light emitted from the optical element 20, an emission direction of the outgoing light, a light distribution of the outgoing light, emission efficiency of the outgoing light, color unevenness of the outgoing light, a speckle noise of the outgoing light, an optical spectrum of the outgoing light, scattering efficiency of the outgoing light, refractive index characteristics, and diffraction characteristics, and the like, and it suffices that the optical performance includes any one of them. An optical spectrum may be defined by, for example, color temperature.

Incoming light enters the optical element 20 from the light emitting unit 75 through a space interposed between the light emitting unit 75 and the optical element 20, but it is not necessarily limited to this. It may be configured such that incoming light enters a first light guide (not shown) such as an optical fiber from the light emitting unit 75, is guided by the first light guide, emitted from the first light guide, and irradiates the optical element 20.

Outgoing light from the optical element 20 irradiates the object 5 through a space interposed between the optical element 20 and the object 5, but it is not necessarily limited thereto. It may be configured such that outgoing light enters a second light guide (not shown), such as an optical fiber, from the optical element 20, is guided by the second light guide, emitted from the second light guide, and then irradiates the object 5.

The outgoing light may illuminate the object 5. That is, the outgoing light irradiates or illuminates in accordance with the incoming light and the optical element 20.

The holder 30 is formed of, for example, a metal or the like. As shown in FIGS. 1A and 1B, a holding portion of the holder 30 holding the light emitting unit 75 is continuous with a holding portion of the holder 30 holding the optical element 20. The holder 30 is a base member shared by the light emitting unit 75 and the optical element 20. The holding portion of the holder 30 holding the light emitting unit 75 may be provided separately from the holding portion of the holder 30 holding the optical element 20.

Such an optical element 20 is basically held at a desired position by the holder 30 and does not cause positional deviation. However, for example, the optical element 20 may cause positional deviation relative to a desired position due to an impact applied to the light radiating device 10 or deterioration over time of the light radiating device 10, etc.

Therefore, the light radiating device 10 includes a detector 50 configured to detect an amount of positional deviation of the optical element 20 relative to a desired position. The detector 50 includes a reflector 51 disposed on an inclined surface 20c of the optical element 20, an eddy current type sensor head 53 disposed on the holder 30, an eddy current type length measurement unit 55, and a wire 57 electrically connecting the sensor head 53 to the length measurement unit 55.

The reflector 51 is, for example, a conductive film made of metal, such as aluminum. The reflector 51 is formed on the inclined surface 20c and is a flat surface. The reflector 51 is formed on, for example, the inclined surface 20c in contact with a first surface of the reflector 51, and the adhesive 47 is applied to a second surface of the reflector 51 that is a surface opposite to the first surface. The reflector 51 is bonded to the holder 30 through the adhesive 47. Therefore, the optical element 20 is disposed on the holder 30.

Figure 1C:
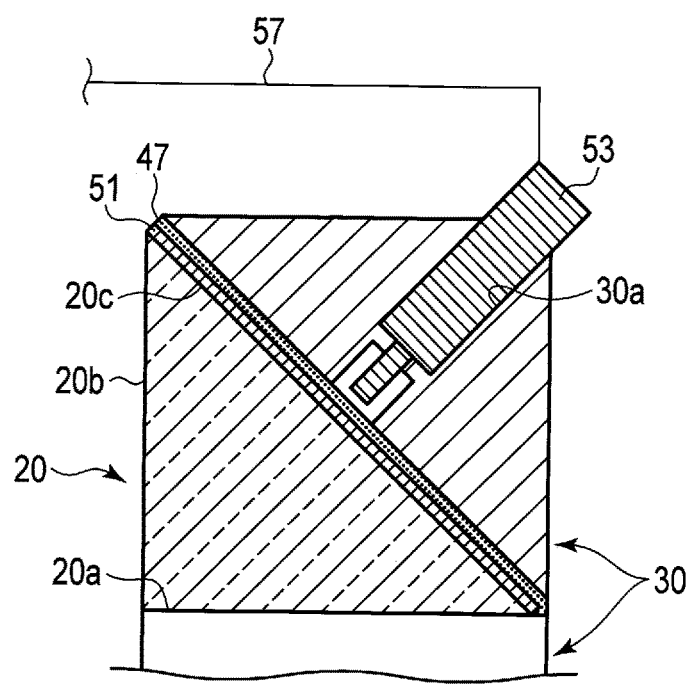
FIG. 1C is a cross-sectional view taken along a line 1C-1C shown in FIG. 1B.

As shown in FIG. 1C, the sensor head 53 is inserted into, for example, a hole 30a of the holder 30, and then fixed to the holder 30 through an adhesive (not shown) or the like. The sensor head 53 is positioned relative to the reflector 51 and the light emitting unit 75. It suffices that the sensor head 53 may be disposed outside the traveling path of light inside the optical element 20. The sensor head 53 is disposed along the normal direction of the reflector 51, which is a direction indicated by an arrow A shown in FIG. 1A. The sensor head 53 has a coil (not shown) inside the sensor head 53. In order to detect positional deviation in the direction of the arrow A and in the direction opposite to the direction, the distal end of the sensor head 53 is preferably separated from the adhesive 47 and the reflector 51.

The length measurement unit 55 is composed of, for example, a hardware circuit including an ASIC or the like. The length measurement unit 55 may be composed of a processor. When the length measurement unit 55 is composed of a processor, a program code for causing the processor to function as the length measurement unit 55 when the processor executes the program code is stored in an internal memory of the processor or an external memory (not shown) provided so as to be accessible by the processor. For example, the length measurement unit 55 is a body provided separately from the holder 30.

Here, detection by the detector 50 in the present embodiment will be described. The detector 50, which includes the reflector 51 of metal, detects, as the amount of positional deviation, a translational movement amount in the first direction among directions defined by the surface of the optical element 20. The first direction is a direction in which the optical performance most sensitively changes as compared with the directions other than the first direction. In the present embodiment, the first direction indicates, for example, the arrow A direction (the normal direction of the reflector 51) shown in FIG. 1A. For example, when the optical element 20 (one-surface reflective prism) deviates in the first direction from a desired position, the detector 50 detects the translational movement amount of the optical element 20 in the first direction. The detector 50 outputs, as a detection result, an electrical signal related to the detected translational movement amount in the first direction to a discrimination unit 71 to be described later.

In detail, generally, when a high frequency current flows in the coil of the sensor head 53, a high frequency magnetic field is generated. When a metal (the reflector 51, which is a conductive film) is disposed inside the high frequency magnetic field, an eddy current flows around the magnetic flux passing through the second surface of the reflector 51 due to electromagnetic induction, and the impedance of the coil changes. The sensor head 53 detects a distance between the reflector 51 and the distal end of the sensor head 53 in the first direction based on a change in the transmission state caused by this phenomenon. This distance changes in accordance with a distance between the optical element 20 and the holder 30 in the first direction. In other words, it changes in accordance with the translational movement amount in the first direction. For example, as the optical element 20 displaces relative to the holder 30 in the first direction to move away from the holder 30, the distance between the reflector 51 and the distal end of the sensor head 53 in the first direction becomes longer, and the translational movement amount in the first direction increases.

The sensor head 53 outputs, as an electrical signal, information on the distance between the reflector 51 and the distal end of the sensor head 53 in the first direction to the length measurement portion 55 through the wire 57. The length measurement unit 55 measures the length using the electric signal output from the sensor head 53 as distance information between the optical element 20 and the holder 30 in the first direction. The length measurement unit 55 outputs the distance information, as an electrical signal related to the detected translational movement amount in the first direction, to the discrimination unit 71.

The detector 50 may start detection at the same time as the light emitting unit 75 is driven, and end the detection when driving of the light emitting unit 75 is stopped. For example, by using an ON instruction signal or an OFF instruction signal from an input unit (not shown) to the light emitting unit 75 as a detection start signal or an end instruction signal of the detector 50, the operation of the detector 50 can be made in conjunction with the operation of the light emitting unit 75.

The detector 50 is not limited to the eddy current type, and may be, for example, existing detectors of an induction power type, electromagnetic wave type, ultrasonic type, or capacitance type. Examples of the electromagnetic wave type detector include a phase type detector, a trigonometric measurement type detector, and a time measurement type detector.

The light radiating device 10 further includes a discrimination unit 71. The discrimination unit 71 is composed of, for example, a hardware circuit including an ASIC or the like. The discrimination unit 71 may be composed of a processor. When the discrimination unit 71 is composed of a processor, a program code for causing the processor to function as the discrimination unit 71 when the processor executes the program code is stored in an internal memory of the processor or an external memory (not shown) provided so as to be accessible by the processor.

The discrimination unit 71 discriminates whether the light radiating device 10 is in a normal state or in an abnormal state based on the detected amount of positional deviation. In the present embodiment, the discrimination unit 71 discriminates the normal state or the abnormal state, based on the translational movement amount in the first direction as the amount of positional deviation.

The normal state indicates a state where the optical element exhibits desired optical performance by being disposed at a desired position. The desired position indicates, for example, a state where the optical element 20 is disposed on the holder 30 through the reflector 51, and the light emitting unit 75 and the optical element 20 maintain a desired positional relationship with each other, or a state where the desired optical performance is maintained even if optical element 20 is disposed away with an extremely small distance from the holder 30.

The abnormal state indicates a state where the optical element 20 is disposed at a position deviating from the desired position. The abnormal state includes a first abnormal state and a second abnormal state. The first abnormal state is an intermediate state between the normal state and the second abnormal state, and is a state that exists while the light radiating device 10 transits from the normal state to the second abnormal state.

The discrimination unit 71 discriminates whether the light radiating device 10 is in the normal state, the first abnormal state, or the second abnormal state, based on the amount of positional deviation detected by the detector 50 and a preset threshold.

The optical performance in the first abnormal state is substantially equal to the optical performance in the normal state. The first abnormal state is a state where positional deviation of the optical element 20 in the first direction occurs with respect to the arrangement position of the optical element 20 in the normal state.

The optical performance in the second abnormal state is lower than the optical performance in the first abnormal state. In the second abnormal state, the amount of positional deviation in the first direction of the optical element 20 in the second abnormal state with respect to the arrangement position of the optical element 20 in the normal state is more than the amount of positional deviation in the first direction of the optical element 20 in the first abnormal state with respect to the arrangement position of the optical element 20 in the normal state. The second abnormal state is a state where the amount of positional deviation in the first direction of the optical element 20 in the first abnormal state has increased.

As described above, the optical performance of the optical element 20 in the first abnormal state is substantially equal to that in the normal state, and the optical performance of the optical element 20 in the second abnormal state is lower than that in the normal state and the first abnormal state. Therefore, the first abnormal state is a state immediately before an abnormality occurs in the optical performance of the optical element 20, indicates a sign of an abnormality in the optical performance, and is a state where an abnormality in the optical performance is expected in the future. The abnormality referred to here is a state where the optical element 20 cannot exhibit a desired optical performance, i.e., a state indicating that the optical performance deteriorates as compared with the optical performance of the optical element 20 in the normal state, for example, indicating that the emission position deviates from the position in the normal state. Therefore, the first abnormal state is a state immediately before the optical performance is definitely deteriorated as compared with the optical performance of the optical element 20 in the normal state. The first abnormal state is a state where the act of operating the light radiating device 10 can be accepted. The first abnormal state may be included in the normal state, focusing on only the optical performance. The second abnormal state is a state where an abnormality has occurred in the optical performance, and is a state where the optical performance has deteriorated. Thus, the first abnormal state includes a state immediately before the second abnormal state (abnormality (i.e., deterioration)), and the start of the abnormality is included in the second abnormal state.

The threshold for the amount of positional deviation includes a first threshold and a second threshold that is a value greater than the first threshold. The threshold is preliminarily stored in a storage 73 of the light radiating device 10. When the discrimination unit 71 is composed of a processor, the threshold may be stored in the above-mentioned internal memory or external memory (not shown) accessible by the processor. The first threshold may be set, for example, as a measurement lower limit value of the detector 50 or as a value obtained by adding a measurement tolerance to the measurement lower limit value. The first threshold and the second threshold may be input in the storage 73 from an input unit (not shown) with desired values and at desired timings according to the usage condition of the light radiating device 10, the environment in which the light radiating device 10 is disposed, the apparatus or system in which the light radiating device 10 is disposed, etc.

For example, when receiving the amount of positional deviation that is a detection result of the detector 50, the discrimination unit 71 accesses the storage 73 to read the threshold. Then, the discrimination unit 71 performs the discrimination. When the amount of positional deviation detected by the detector 50 is less than the first threshold, the discrimination unit 71 discriminates that the light radiating device 10 is in the normal state. When the amount of positional deviation detected by the detector 50 is equal to or more than the first threshold and less than the second threshold, the discrimination unit 71 discriminates that the light radiating device 10 is in the first abnormal state. When the amount of positional deviation is equal to or more than the second threshold, the discrimination unit 71 discriminates that the light radiating device 10 is in the second abnormal state. The discrimination unit 71 outputs the discrimination result to a presentation unit 101 and a controller 103 to be described later.

Figure 1D:
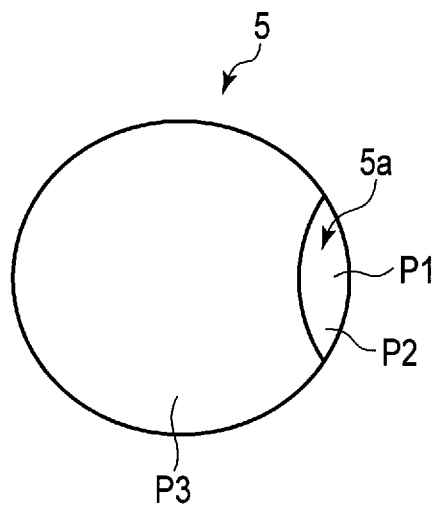
FIG. 1D is a diagram for explaining an event in an abnormal state of the first embodiment in which positional deviation occurs in a first direction.

Here, with reference to FIG. 1D, an event in an abnormal state of the present embodiment in which the positional deviation occurs in the first direction will be briefly described. In the present embodiment, the emission position of outgoing light in the optical element 20 changes in proportion to the amount of positional deviation. This change means that the emission position in the abnormal state deviates in the first direction relative to the emission position in the normal state.

In the first abnormal state, since the positional deviation of the emission position is small, the optical performance of the outgoing light irradiating the object 5 at a desired position is not lost. In the second abnormal state, since the positional deviation of the emission position is large, the optical performance of the outgoing light irradiating the object 5 at a desired position is lost. Examples of the second threshold that is a boundary between the first abnormal state and the second abnormal state include Example 1 and Example 2 described below.

The second threshold in Example 1 indicates a threshold of the translational movement amount of the optical element 20 corresponding to a threshold at which the outgoing light deviates from the range where the light converges to a region 5a. The region 5a indicates a portion (light receiving region) of a scattering member having the highest scattering efficiency of the scattering member as an object 5.

In Example 1, if the outgoing light irradiates somewhere in the region 5a, the outgoing light is scattered by the scattering member as desired, in other words, the scattering efficiency becomes the highest. It is assumed that both a point P1 and a point P2 that is a different position from the point P1 exist in the region 5a. The point P1 indicates the irradiation position of the outgoing light in the normal state. The point P2 indicates the irradiation position of the outgoing light when positional deviation in the first direction occurs. There is no significant difference in the scattering efficiency between the case where the outgoing light is radiated to the point P1 and the case where the outgoing light is radiated to the point P2, and high scattering efficiency can be obtained in either case. That is, in either case, the same optical performance (scattering efficiency) can be obtained.

When positional deviation in the first direction occurs, the irradiation position of the outgoing light in the scattering member changes. Here, the optical performance of the optical element 20 in the state where such a positional deviation that the irradiation position falls within the region 5a occurs is substantially equal to the optical performance of the optical element 20 in the normal state. In other words, if the amount of positional deviation is equal to or more than the first threshold and less than the second threshold, the optical performance of the optical element 20 in this state is equal to the optical performance of the optical element 20 in the normal state, and it is said that the light radiating device 10 is in the first abnormal state.

The optical performance of the optical element 20 in the state where such a positional deviation that the irradiation position is located outside the region 5a (for example, point P3) occurs is lower than the optical performance of the optical element 20 in the normal state and in the first abnormal state. The amount of positional deviation in this state with respect to the arrangement position of the optical element 20 in the normal state is more than the amount of positional deviation in the first abnormal state with respect to the arrangement position of the optical element 20 in the normal state. In other words, if the amount of positional deviation is equal to or more than the second threshold, the optical performance of the optical element 20 in this state is lower than the optical performance of the optical element 20 in the normal state and in the first abnormal state, and it is said that the light radiating device 10 is in the second abnormal state.

A second threshold value in Example 2 indicates a threshold of the translational movement amount of the optical element 20 corresponding to a threshold of the positional deviation of the optical element 20 in which the outgoing light does not irradiate a scattering member as an object 5.

In Example 2, when outgoing light is radiated somewhere onto the object 5, such as points P1, P2, and P3, the outgoing light is scattered as desired, in other words, the scattering efficiency becomes the highest. When positional deviation in the first direction occurs, the irradiation position of the outgoing light in the scattering member changes. Here, the optical performance of the optical element 20 in the state where such a positional deviation that the irradiation position falls within the object 5 occurs is substantially equal to the optical performance of the optical element 20 in the normal state. In other words, if the amount of positional deviation is equal to or more than the first threshold and less than the second threshold, the optical performance of the optical element 20 in this state is equal to the optical performance of the optical element 20 in the normal state, and it can be said that the light radiating device 10 is in the first abnormal state.

The optical performance in the state where such a positional deviation in which the irradiation position is located outside the object 5 occurs is lower than the optical performance of the optical element 20 in the normal state and in the first abnormal state. The amount of positional deviation in this state with respect to the arrangement position of the optical element 20 in the normal state is more than the amount of positional deviation in the first abnormal state with respect to the arrangement position of the optical element 20 in the normal state. In other words, if the amount of positional deviation is equal to or more than the second threshold, the optical performance of the optical element 20 in this state is lower than the optical performance of the optical element 20 in the normal state and in the first abnormal state, and it is said that the light radiating device 10 is in the second abnormal state.

As shown in FIG. 1A, the light radiating device 10 further includes the above-mentioned light emitting unit 75 configured to emit incoming light toward the optical element 20, and an alarm 77 configured to output an alarm indicating that the light radiating device 10 is in an abnormal state.

The alarm 77 includes, for example, a display configured to display an alarm to the user of the light radiating device 10 or a transmission section configured to transmit an alarm to the user. The display includes, for example, a monitor, etc., and in the monitor, etc., characters, symbols, figures, images, light emission, and the like can be considered as examples of the alarm. The transmission section includes, for example, a vibration device or an audio device. In the transmission section, vibration, voice, and the like can be considered as examples of the alarm. In the alarm 77, the method for the alarm is not particularly limited. The alarm 77 may also serve as a presentation unit 101 to be described later. The alarm 77 outputs an alarm under the control of the controller 103 to be described later, in which the discrimination result of the discrimination unit 71 has been input.

Such a light radiating device 10 is mounted on a light radiation system 100. The light emitting unit 75 and the alarm 77 may be included in the light radiation system 100 instead of the light radiating device 10. The light radiation system 100 includes a presentation unit 101 configured to present a discrimination result of the discrimination unit 71, and a controller 103 configured to control the light radiating device 10 in accordance with the discrimination result of the discrimination unit 71 of the light radiating device 10.

The discrimination result presented by the presentation unit 101 indicates the current state of the light radiating device 10. The presentation unit 101 receives input on the discrimination result of the discrimination unit 71, and performs presentation according to the discrimination result. The presentation unit 101 includes, for example, a display configured to display the discrimination result to the user, or a transmission section configured to transmit the discrimination result to the user. The presentation unit 101 includes, for example, a monitor, etc. In a monitor etc., a character, a symbol, a figure, an image, etc. can be considered as examples of the presentation. The transmission section includes, for example, a vibration device or an audio device. In the transmission section, vibration, voice, etc. can be considered as examples of the presentation. The method of presentation in the presentation unit 101 is not particularly limited. The presentation unit 101 may be included in the light radiating device 10.

The controller 103 is composed, for example, of a hardware circuit including an ASIC or the like. The controller 103 may also be composed of a processor. If the controller 103 is composed of a processor, a program code for causing the processor to function as the controller 103 when the processor executes the program code is stored in advance in an internal memory of the processor or an external memory (not shown) provided so as to be accessible by the processor.

The controller 103 controls the light emitting unit 75 based on a discrimination result of the discrimination unit 71 that the light radiating device is in the normal state. At this time, the light emitting unit 75 emits light of, for example, a maximum light quantity.

The controller 103 performs first control on the light radiating device 10 based on the discrimination result of the discrimination unit 71 that the light radiating device is in the first abnormal state. The controller 103 performs second control on the light radiating device 10 based on the discrimination result of the discrimination unit 71 that the light radiating device is in the second abnormal state.

As a first example of the first and second control, the controller 103 performs, as the first control, such control on the light emitting unit 75 that the light quantity of incoming light in the first abnormal state is smaller than the light quantity of incoming light to the optical element 20 in the normal state. The first control referred to here is control to reduce the quantity of light emitted from the light emitting unit 75. The controller 103 performs, as second control, at least one of light quantity control, stop control, and alarm control. In the light quantity control, the controller 103 performs such control on the light emitting unit 75 that the light quantity of incoming light in the second abnormal state is smaller than the light quantity of incoming light in the first abnormal state. The light quantity control referred to here is control to further reduce the quantity of light emitted from the light emitting unit 75 as compared with the quantity of light in the first control. For the light quantity control in the first and second control, the controller 103 controls, for example, a value of electrical current flowing to the light emitting unit 75 to be less than the thresholds in the first and second control that are preset for the electrical current value. These thresholds are desired values according to the use condition of the light radiating device 10, the environment in which the light radiating device 10 is disposed, the apparatus or system in which the light radiating device 10 is disposed, etc. For example, the thresholds may be input as desired from an input unit (not shown) to the controller 103. The threshold may be preliminarily stored in the storage 73, and the controller 103 may access the storage 73 to read the threshold. For example, the light emitting unit 75 may have a diaphragm or a filter for light quantity control. In the stop control, the controller 103 performs control on the light emitting unit 75 to stop the emission of light. For example, for the stop control, the electrical current value may become zero, or light shielding may be performed by a diaphragm. In the alarm control, the controller 103 performs control on the alarm 77 to output an alarm indicating that the light radiating device 10 is in the second abnormal state.

As a second example of the first and second control, the controller 103 performs, on the alarm 77, as the first control, the alarm control for the alarm 77 to output an alarm indicating that the light radiating device is in the first abnormal state. The controller 103 performs, as the second control, at least one of light quantity control, stop control, and alarm control. In the light quantity control, the controller 103 performs such control on the light emitting unit 75 that the light quantity of incoming light to the optical element 20 in the second abnormal state is smaller than the light quantity of incoming light to the optical element 20 in the normal state and in the first abnormal state. The light quantity control referred to here is control to reduce the quantity of light emitted from the light emitting unit 75. In the stop control, the controller 103 performs control on the light emitting unit 75 to stop the emission of light. In the alarm control, the controller 103 performs control on the alarm 77 to output an alarm indicating that the light radiating device 10 is in the second abnormal state.

Hereinafter, an example of driving of the light radiation system 100 will be described.

Light emitted from the light emitting unit 75 enters the optical element 20 from the first side surface 20a and travels inside the optical element 20 toward the reflector 51. The incoming light is reflected by the reflector 51, travels inside the optical element 20 toward the second side surface 20b, and is emitted to the outside of the optical element 20 from the second side surface 20b. The outgoing light irradiates the object 5.

The detector 50 detects an amount of positional deviation to output the amount of positional deviation to the discrimination unit 71. The discrimination unit 71 discriminates whether the light radiating device 10 is in the normal state, the first abnormal state, or the second abnormal state, based on the amount of positional deviation and a preset threshold value.

When the optical element 20 is disposed at a desired position, the optical element 20 exhibits desired optical performance. At this time, the amount of positional deviation detected by the detector 50 is less than the first threshold, and therefore the discrimination unit 71 discriminates that the light radiating device 10 is in the normal state.

Here, it is assumed that positional deviation of the optical element 20 occurs with respect to the arrangement position of the optical element 20 in the normal state.

At this time, if the amount of positional deviation detected by the detector 50 is equal to or more than the first threshold and less than the second threshold, the discrimination unit 71 discriminates that although the optical performance of the optical element 20 is substantially equal to the optical performance of the optical element 20 in the normal state, positional deviation of the optical element 20 in the first state has occurred with respect to the arrangement position of the optical element 20 in the normal state. That is, the discrimination unit 71 discriminates that the light radiating device 10 is in the first abnormal state.

In addition, when the amount of positional deviation detected by the detector 50 becomes equal to or more than the second threshold, the discrimination unit 71 discriminates that the optical performance of the optical element 20 is lower than the optical performance of the optical element 20 in the first abnormal state, and the amount of positional deviation in the second abnormal state with respect to the arrangement position of the optical element 20 in the normal state becomes larger than the amount of positional deviation in the first abnormal state with respect to the arrangement position of the optical element 20 in the normal state. That is, the discrimination unit 71 discriminates that the light radiating device 10 is in the second abnormal state.

The discrimination unit 71 outputs the discrimination result to the controller 103, and the controller 103 controls the light radiating device 10 according to the discrimination result of the discrimination unit 71.

When the light radiating device 10 is in the first abnormal state, the controller 103 performs the first control on the light emitting unit 75, for example, in the above-mentioned first example of the first and second control. Through the first control, the light quantity of incoming light to the optical element 20 in the first abnormal state becomes smaller than the light quantity of incoming light to the optical element 20 in the normal state. Alternatively, the controller 103 may perform the first control on the alarm 77 as in the above-mentioned second example of the first and second control. Through the first control, an alarm indicating that the light radiating device is in the first abnormal state is output from the alarm 77.

When the light radiating device 10 is in the second abnormal state, the controller 103 performs, as the second control, for example, in the first example of the first and second control, at least one of the light quantity control, the stop control, and the alarm control. Through the light quantity control for the light emitting unit 75, the light quantity of the incoming light to the optical element 20 in the second abnormal state becomes smaller than the light quantity of the incoming light to the optical element 20 in the first abnormal state. Through the stop control for the light emitting unit 75, the emission of incoming light is stopped. Through the alarm control for the alarm 77, an alarm indicating that the light radiating device is in the second abnormal state is output.

The discrimination unit 71 outputs a discrimination result to the presentation unit 101, and the presentation unit 101 presents the discrimination result. The discrimination result indicates the current state of the light radiating device 10, in other words, it indicates whether the light radiating device 10 is in the normal state, the first abnormal state, or the second abnormal state.

In the present embodiment, the amount of positional deviation can be detected by the detector 50, and it can be discriminated by the discrimination device based on the amount of positional deviation whether the light radiating device 10 is in the first abnormal state or the second abnormal state.

In the present embodiment, the abnormal state includes the first abnormal state and the second abnormal state. The first abnormal state is an intermediate state between the normal state and the second abnormal state, and is a state that exists while the light radiating device 10 transits from the normal state to the second abnormal state. The discrimination unit 71 discriminates whether the light radiating device 10 is in the normal state, the first abnormal state, or the second abnormal state, based on the amount of positional deviation detected by the detector 50 and a preset threshold. Therefore, in the present embodiment, the state of the light radiating device 10 can be discriminated before the optical element 20 can no longer exhibit the desired optical performance, i.e., before the light radiating device 10 reaches the second abnormal state, in other words, in the first abnormal state indicating a sign of abnormality. In other words, the state of the light radiating device 10 can be discriminated before the occurrence of the second abnormal state that indicates the state where the abnormality in the optical performance has occurred. It is desirable for the user of the light radiating device 10 to ascertain whether or not the light radiating device 10 is in an abnormal state before using the light radiating device 10 without noticing that the optical performance is in a deteriorated state, in other words, before the light radiating device 10 reaches the second abnormal state. In the present embodiment, since the state of the light radiating device 10 can always be ascertained, it is possible to solve the problem that the user uses the light radiating device 10 without noticing the state where the optical performance of the light radiating device 10 is in a deteriorated state.

The first abnormal state includes a state immediately before the second abnormal state. Therefore, it is possible to discriminate the state of the light radiating device 10 until just before an occurrence of an abnormality in the optical performance. Then, it is also possible to stop the light radiating device 10 in the first abnormal state to repair the light radiating device 10.

The light radiating device 10 does not reach the second abnormal state directly from the normal state, but reaches the second abnormal state after passing through the first abnormal state from the normal state. Therefore, in the present embodiment, the state of the light radiating device 10 is not discriminated for the first time when the light radiating device 10 has reached the second abnormal state, but the abnormality of the optical performance can be ascertained in the first abnormal state preliminarily as a sign. Therefore, for example, when eye safety against outgoing light is required, the state of the light radiating device 10 can be discriminated before an occurrence of the second abnormal state, and thus the eye safety can be improved.

In the present embodiment, the discrimination unit 71 discriminates whether the light radiating device 10 is in the normal state, the first abnormal state, or the second abnormal state, based on the amount of positional deviation, the first threshold, and the second threshold. Therefore, in the present embodiment, the normal state, the first abnormal state, and the second abnormal state can be discriminated with high accuracy. Also, it is possible to prevent the light radiating device 10 in the normal state from being misrecognized as being in the second abnormal state. The respective ranges of the normal state, the first abnormal state, and the second abnormal state can be changed according to the use condition, etc. of the light radiating device 10 through use of the first threshold and the second threshold set as desired.

In the present embodiment, the controller 103 controls the light radiating device 10 in accordance with the discrimination result of the discrimination unit 71. Therefore, in the first abnormal state, the light quantity of incoming light can be made smaller than in the normal state, or an alarm indicating that the light radiating device is in the first abnormal state can be output. The controller 103 performs, in the second abnormal state, at least one of light quantity control, stop control, and alarm control. With this configuration, in the light quantity control, the light quantity of incoming light to the optical element 20 can be made smaller than that in the first abnormal state; in the stop control, the emission of the incoming light brought into the optical element 20 can be stopped; and in the alarm control, an alarm indicating that the light radiating device is in the second abnormal state can be output.

In the present embodiment, it can be presented to the user of the light radiating device 10 through the presentation unit 101 whether the light radiating device 10 is in the normal state, the first abnormal state, or the second abnormal state.

[Modification 1]

A modification 1 of the present embodiment will be described with reference to FIGS. 2A, 2B, 2C, 2D, 2E, and 2F. A length measurement unit 55, a wire 57, a discrimination unit 71, a storage 73, an alarm 77, a presentation unit 101, and a controller 103 in this modification are the same as those in the first embodiment. So, the illustrations thereof are omitted.

An optical element 20 according to the modification is not limited to a one-surface reflective prism. The optical element 20 may include, for example, any of a two-face reflective prism, a corner cube, a polarizer, a diffusing member, a wavelength converting member, such as a fluorescent substance, and a lens. In the following, the optical element 20 will be described as being a fluorescent substance.

The optical element 20 has a square pole shape. The reflector 51 is disposed on peripheral surfaces of the fluorescent substance other than a left side surface 20d and a front side surface 20e of the optical element 20. As shown in FIG. 2E, light emitted from the light emitting unit 75 passes through a hole 30b in the holder 30 and the reflector 51 and enters the optical element 20 from the lower side surface of the optical element 20.

The optical element 20 absorbs incoming light, which is, for example, laser light, and emits outgoing light that is fluorescence. The optical element 20 emits outgoing light in all directions. A part of the outgoing light is emitted from the left side surface 20d and the front side surface 20e to the outside of the optical element 20 and travels to an object. Another part of the outgoing light is emitted toward the peripheral surfaces of the fluorescent substance other than the left side 20d and the front side 20e is reflected by the reflector 51 toward the left side surface 20d and the front side surface 20e, and travels inside the fluorescent substance toward the left side surface 20d and the front side surface 20e. The outgoing light that has traveled is efficiently emitted from the left side surface 20d and the front side surface 20e toward the outside of the fluorescent substance, and travels to the object. Then, the outgoing light as fluorescence illuminates the object.

The direction in which positional deviation of the optical element 20 according to this modification occurs differs from the direction in which positional deviation of the optical element 20 according to the first embodiment occurs, depending on the shape of the optical element 20 and the position of the reflector 51. Specifically, in this modification, positional deviation (translation in the first direction) of the optical element 20 occurs in an orthogonal direction that is orthogonal to an entrance direction (Z direction) of the incoming light. The orthogonal direction indicates an X direction or a Y direction. The Y direction is orthogonal to the X direction and the Z direction. The X direction is a direction orthogonal to the left side surface 20d. The Y direction is a direction orthogonal to the front side surface 20e.

Here, the case where the positional deviation (translation in the first direction) of the optical element 20 occurs in either one of the orthogonal directions of the incoming light (X direction or Y direction) will be described below. This description also applies to the case where positional deviation (translation in the first direction) of the optical element 20 occurs in both the orthogonal directions (X direction and Y direction).

When the amount of positional deviation is less than a threshold of an amount of positional deviation that is determined based on the hole 30b in the holder 30 and the reflector 51 and a beam diameter of laser light emitted from the light emitting unit 75, the optical performance of the optical element 20 emitting outgoing light is not affected by the amount of positional deviation, and the optical performance of the optical element 20 in this state is substantially equal to the optical performance of the optical element in the normal state. That is, the light radiating device 10 is in the first abnormal state.

When the amount of positional deviation is equal to or more than the threshold of the amount of positional deviation, the laser light emitted from the light emitting unit 75 is blocked by the reflector 51 and does not enter the optical element 20, and outgoing light is not generated or emitted. The optical performance of the optical element 20 of emitting outgoing light becomes lower than the optical performance of the optical element 20 in the first abnormal state. That is, the light radiating device 10 is in the second abnormal state.

Positional deviation cannot occur in the configuration of this modification; however, in a structure in which there is a gap between the reflector 51 on the upper side surface and the holder 30, there may be a case where positional deviation of the optical element 20 (translation in the second direction) occurs in the entrance direction (Z direction). In this case, since the optical element 20 moves translationally in the traveling direction of the incoming light, an event that incoming light does not enter the optical element 20 is less likely to occur than in the translational movement in the first direction. Therefore, even if positional deviation (translation in the second direction) occurs in the entrance direction, the light radiating device 10 remains in the normal state.

Therefore, in this modification, it suffices that the amount of positional deviation in the orthogonal directions as the first direction (X direction or Y direction) is taken into account. In the detector 50 of this modification, a sensor head 53X is provided in order to detect the amount of positional deviation in the X direction, and a sensor head 53Y is provided in order to detect the amount of positional deviation in the Y direction. The respective functions of the sensor head 53X and the sensor head 53Y are the same as those of the sensor head 53, so detailed description thereof are omitted. The length measurement unit 55 may be shared by the sensor head 53X and the sensor head 53Y, or may be provided on each of the sensor head 53X and the sensor head 53Y.

In this modification, the detector 50 may detect two amounts of positional deviation in two directions of the X direction and the Y direction as the first direction, or may detect the amount of positional deviation in the X direction or the positional deviation in the Y direction.

In this modification, even if the optical element 20 is a fluorescent substance, the same effect as that of the first embodiment can be obtained. Moreover, in this modification, it is possible to discriminate whether or not the light radiating device 10 is in an abnormal state in the X direction, and discriminate whether or not the light radiating device 10 is in an abnormal state in the Y direction.

Furthermore, for example, it is assumed that the light radiating device 10 is in the first abnormal state in either the X direction or the Y direction, and is in the normal state in the other direction of the X direction and the Y direction, or the light radiating device 10 is in the first abnormal state in both the X direction and the Y direction. In this case, it is possible to discriminate that the light radiating device 10 is in the first abnormal state, and it is possible to easily detect without fail that the light radiating device 10 is in the first abnormal state. Furthermore, for example, when the light radiating device 10 is in the second abnormal state in either the X direction or the Y direction, the entirety of the light radiating device 10 can be discriminated as being in the second abnormal state.

It suffices that the optical performance of the fluorescent substance as the optical element 20 includes any one of the conversion efficiency of light, the color unevenness of the outgoing light, the optical spectrum of the outgoing light, and the light distribution of the outgoing light. The conversion efficiency indicates a proportion of the light quantity of outgoing light to the light quantity of incoming light. When the optical performance in question is changed, it is preferable that the first direction corresponding to each optical performance be discriminated.

[Modification 2]

Figure 2A:
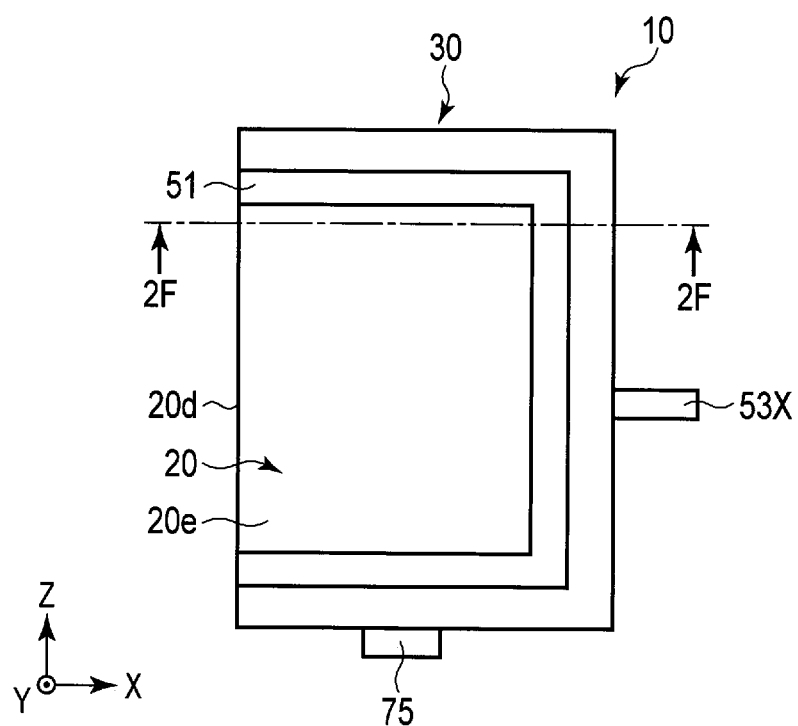
FIG. 2A shows a modification 1 of the first embodiment, and is a front view of a holder holding an optical element of the modification 1.
Figure 2F:
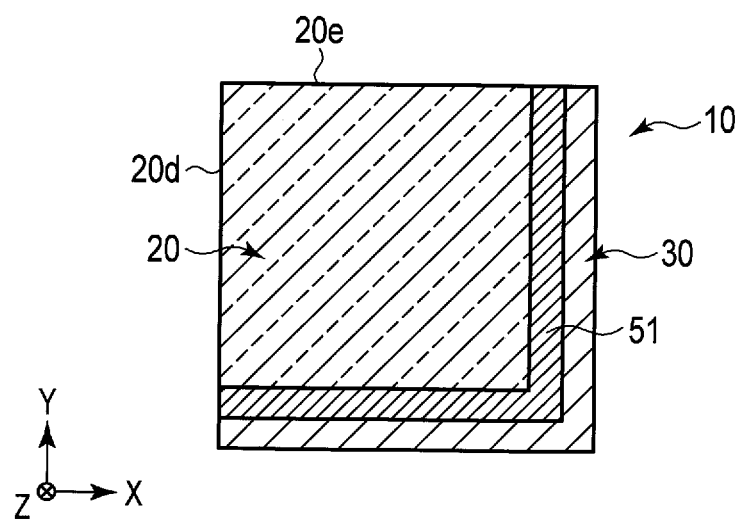
FIG. 2F is a cross-sectional view taken along a line 2F-2F shown in FIG. 2A.
Figure 2G:
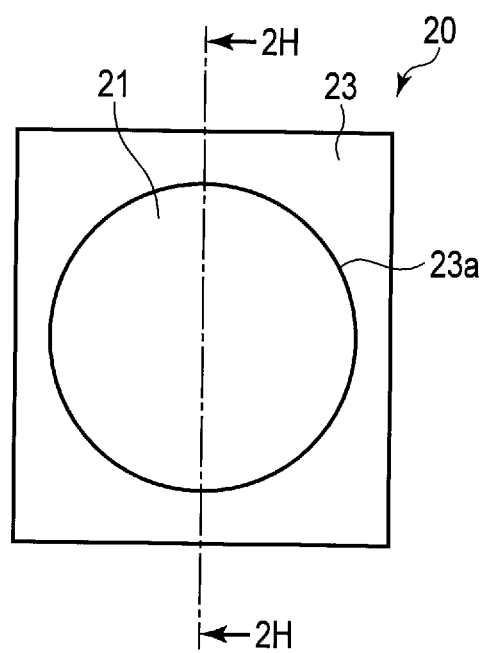
FIG. 2G shows a modification 2 of the first embodiment, and is a front view of an optical element.
Figure 2H:
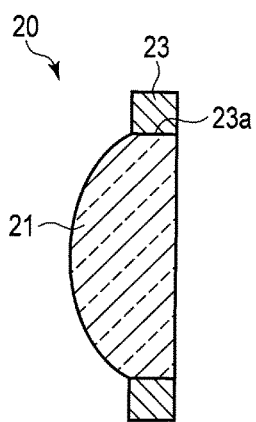
FIG. 2H is a cross-sectional view taken along a line 2H-2H shown in FIG. 2G.

A modification 2 of the present embodiment will be described with reference to FIGS. 2G and 2H. An example of the optical element 20 of the present embodiment will be described below. A holder 30, a sensor head 53, a length measurement unit 55, a wire 57, a discrimination unit 71, a storage 73, an alarm 77, a presentation unit 101, and a controller 103 in this modification are the same as those in the first embodiment. So, illustrations thereof are omitted.

For example, a lens 21 and a lens holder 23 holding the lens 21 may be regarded as the optical element 20. The lens 21 has, for example, a circular shape. The lens 21 is, for example, a convex lens. The lens holder 23 has a circular hole 23a into which the lens 21 is fitted, and encloses the outer periphery of the lens 21. The lens holder 23 is formed of an electrical conductor. For this reason, the reflector 51, which is the conductive film made of metal, is not necessarily film-formed by the lens holder 23. If the distal end of the sensor head 53 is disposed within the proximity of the lens holder 23, the length measurement unit 55 can measure a distance between the lens holder 23 and the distal end of the sensor head 53, in other words, distance information between the optical element 20 and the holder 30. The proximity indicates, for example, a distance over which the impedance of the coil can change. Such a configuration is preferable for an optical element 20 having a large number of curved surfaces like the lens 21, and in the case where the joint between the lens 21 and the lens holder 23 is relatively robust.

The optical element 20 is not limited to the lens 21 and the lens holder 23. The optical element 20 may include a one-surface reflective prism and a prism holder that functions as a holding portion of the holder 30 holding the one-surface reflective prism. The prism holder may be formed of a conductor, and the reflector 51 as a conductive film made of metal may be omitted.

Second Embodiment

Figure 3C:
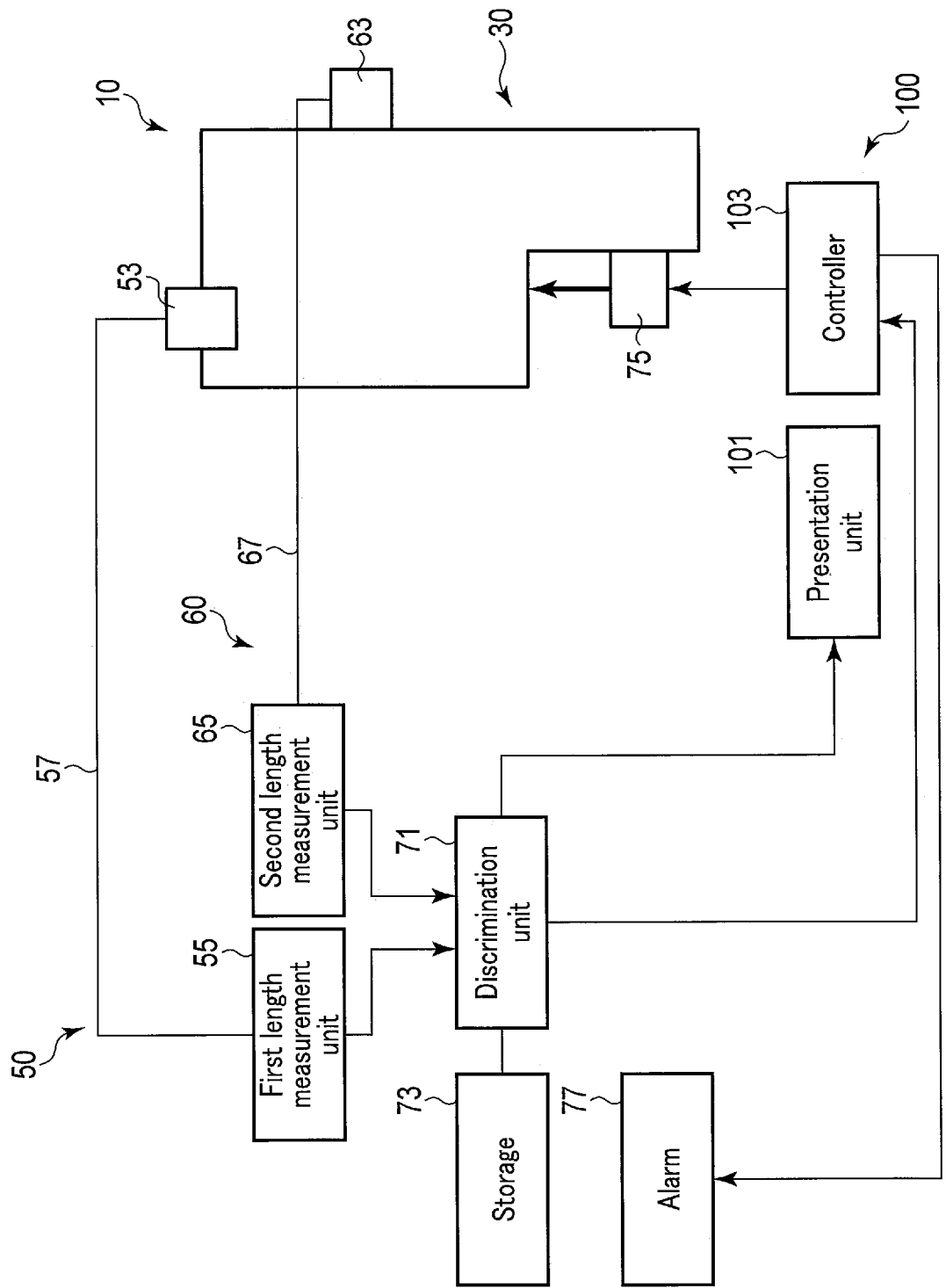
FIG. 3C is a schematic view of a light radiation system based on the right side view of a holder shown in FIG. 3A.

Hereinafter, a second embodiment of the present invention will be described with reference to FIGS. 3A, 3B, and 3C. In the present embodiment, only differences from the first embodiment will be described.

In the present embodiment, positional deviation (translation) of an optical element 20 occurs in a first direction indicating a normal direction of a reflector 51, which is a direction indicated by an arrow A shown in FIG. 3A, and in a second direction that is orthogonal to the first direction. The second direction is a direction indicated by an arrow B shown in FIG. 3B.

In the present embodiment, the detector 50 described in the first embodiment is referred to as a first detector 50 for convenience. Respective portions of the first detector 50 are referred to as a first reflector 51, a first sensor head 53, a first length measurement unit 55, and a first wire 57 for convenience. The first detector 50 detects, as the amount of positional deviation, a translational movement amount in the first direction among directions defined by the surface of the optical element 20.

Also, in the present embodiment, a detector other than the first detector 50 is used, which detects, as the amount of positional deviation, a translational movement amount in the second direction among the directions defined by the surface of the optical element 20. This detector is referred to as a second detector 60 for convenience. The second detector 60 has the same configuration as the first detector 50, and operates in the same manner as the first detector 50. The second detector 60 includes a second reflector 61 corresponding to the first reflector 51, an eddy current type second sensor head 63 corresponding to the first sensor head 53, a second length measurement section 65 corresponding to the first measurement section 55, and a second wire 67 corresponding to the first wire 57 and connecting the second sensor head 63 to the second length measurement section 65.

The second reflector 61 is, for example, a conductive film made of metal, such as aluminum. The second reflector 61 is formed on a bottom surface 20*f* of the optical element 20 having a triangular prism shape, and is a flat surface. The second reflector 61 is formed, for example, on a first surface of the second reflector 61 at the bottom surface 20*f* of the optical element 20, and an adhesive 47 is applied onto a second surface of the second reflector 61, which is the surface opposite to the first surface. The second reflector 61 is bonded to the holder 30 through the adhesive 47. Therefore, the optical element 20 is fixed to the holder 30 at two places.

The second sensor head 63 is inserted, for example, into a hole (not shown) in the holder 30, and fixed to the holder 30 by an adhesive (not shown) or the like. The second sensor head 63 is positioned relative to the second reflector 61 and the light emitting unit 75. It suffices that the second sensor head 63 is disposed outside the traveling path of light inside the optical element 20. The second sensor head 63 is disposed along the second direction. In other words, the second sensor head 63 is disposed along the normal direction of the second reflector 61, which is a direction indicated by an arrow B shown in FIG. 3B. The second sensor head 63 has a coil (not shown) inside the second sensor head 63.

Similarly to the first length measurement unit 55, the second length measurement section 65 is composed of a hardware circuit including, for example, an ASIC or the like.

The second detector 60 detects, as an amount of positional deviation, a translational movement amount in the second direction. For example, when the optical element 20 (one-surface reflective prism) deviates from a desired position in the second direction, the second detector 60 detects the translational movement amount of the optical element 20 in the second direction. The second detector 60 outputs, as a detection result, an electrical signal related to the detected translational movement amount in the second direction to the discrimination unit 71.

As described above, the first and second detectors 50 and 60 detect, as amounts of positional deviation, translational movement amounts in respective directions of the directions defined by the surface of the optical element 20. The directions include a first direction and a second direction that is a direction other than the first direction. The first direction is a direction in which the optical performance most sensitively changes as compared with the directions other than the first direction and including the second direction.

The optical performance in the first abnormal state is substantially equal to the optical performance in the normal state. The first abnormal state is a state where positional deviation of the optical element 20 in the first direction occurs with respect to the arrangement position of the optical element 20 in the normal state.

The optical performance in the second abnormal state is lower than the optical performance in the first abnormal state. In the second abnormal state, the amount of positional deviation in the first direction of the optical element 20 in the second abnormal state with respect to the arrangement position of the optical element 20 in the normal state is more than the amount of positional deviation in the first direction of the optical element 20 in the first abnormal state with respect to the arrangement position of the optical element 20 in the normal state.

The threshold for the amount of positional deviation includes a first threshold and a second threshold related to the first direction, and a third threshold related to the second direction. The second threshold is a value greater than the first threshold. The thresholds are preliminarily stored in the storage 73. When the discrimination unit 71 is composed of a processor, the thresholds may be stored in an internal memory of the processor or an external memory (not shown) provided so as to be accessible by the processor. The first threshold may be set, for example, as a measurement lower limit value of the first detector 50 or as a value obtained by adding a measurement tolerance to the measurement lower limit value. The third threshold may be set, for example, as a measurement lower limit value of the second detector 60 or as a value obtained by adding a measurement tolerance to the measurement lower limit value. The third threshold may be set, for example, as a desired percentage (for example, 50% or 75%) relative to the translational movement amount when the optical performance of the outgoing light radiated to an object 5 at a desired position is lost. The first, second, and third thresholds may be input in the storage 73 from an input unit (not shown) with desired values and at desired timings according to the usage condition of the light radiating device 10, the environment in which the light radiating device 10 is disposed, the apparatus or system in which the light radiating device 10 is disposed, etc.

For example, when receiving amounts of positional deviation as detection results of the first and second detectors 50, 60, the discrimination unit 71 accesses the storage 73 to read the thresholds. Then, the discrimination unit 71 performs discrimination. When the amount of positional deviation in the first direction is less than the first threshold, and the amount of positional deviation in the second direction is less than the third threshold, the discrimination unit 71 discriminates that the light radiating device 10 is in the normal state. When the amount of positional deviation in the first direction is equal to or more than the first threshold and less than the second threshold, or when the amount of positional deviation in the first direction is less than the first threshold and the amount of positional deviation in the second direction is equal to or more than the third threshold, the discrimination unit 71 discriminates that the light radiating device 10 is in the first abnormal state. When the amount of positional deviation in the first direction is equal to or more than the second threshold, the discrimination unit 71 discriminates that the light radiating device 10 is in the second abnormal state.

Here, since the event in the abnormal state of the present embodiment in which positional deviation occurs in the first direction is the same as the event described in the first embodiment, the explanation thereof is omitted in the present embodiment.

Next, the event in the abnormal state of the present embodiment in which positional deviation occurs in the second direction will be briefly described.

Even if positional deviation occurs in the second direction, the emission position of light in the optical element 20 does not change in proportion to the amount of positional deviation in the second direction. Specifically, when the optical element 20 deviates in an arbitrary direction orthogonal to the first direction (arrow A), the emission position of light in the optical element 20 does not change. The orthogonal direction indicates, for example, the arrow B shown in FIG. 3B. However, the orthogonal direction is not limited thereto, and a group of directions that are respectively orthogonal to the first direction and exist in infinite number within 360 degrees, with the first direction regarded as a rotation axis, may be used as a second direction.

If the amount of positional deviation in the second direction falls within a range where light emitted from the light emitting unit 75 irradiates the optical element 20, the emission position of the light emitted from the optical element 20 does not change, so that the light radiating device 10 is in the abnormal state.

If the amount of positional deviation in the second direction is within a range where the light emitted from the light emitting unit 75 does not irradiate the optical element 20, that is, if the light does not irradiate the optical element 20, the emission position changes. Specifically, light is not emitted from the optical element 20. At that time, the light radiating device 10 has become unable to exhibit the function of the light radiating device 10, so that the light radiating device 10 is in the second abnormal state.

For the reasons described above, even if the optical element 20 starts to move translationally in the second direction, the optical performance of the optical element 20 does not change immediately. On the other hand, the translation in the first direction has the most effect on the optical performance of the optical element 20 as compared with the directions other than the first direction and including the second direction. This is because the directions other than the first direction and the second direction can be represented by a vector sum of the first direction and the second direction. For the reason described above, as an amount of a first direction component of the vector is larger, the optical performance of the optical element 20 more largely changes. Therefore, this is because it can be said that if the optical element 20 moves translationally in a fixed amount, the first direction in which a second direction component is zero is a direction in which the optical performance of the optical element 20 most largely changes than in the group of directions in which the second direction component is not zero.

In the present embodiment, it is possible to easily detect without fail that the light radiating device 10 is in the first abnormal state.

Third Embodiment

Figure 4A:
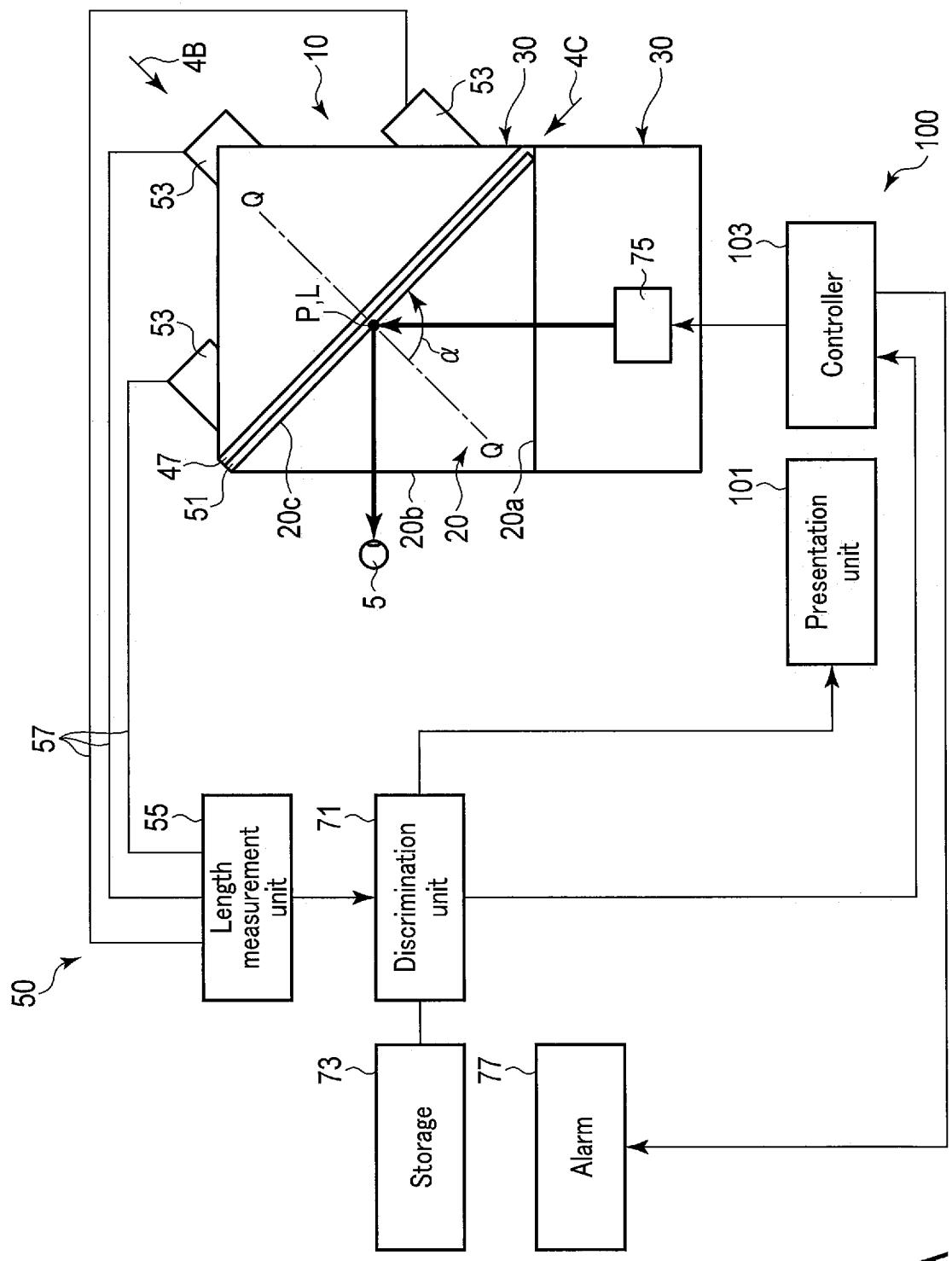
FIG. 4A is a schematic view of a light radiation system including a light radiating device according to a third embodiment of the present invention.
Figure 4B:
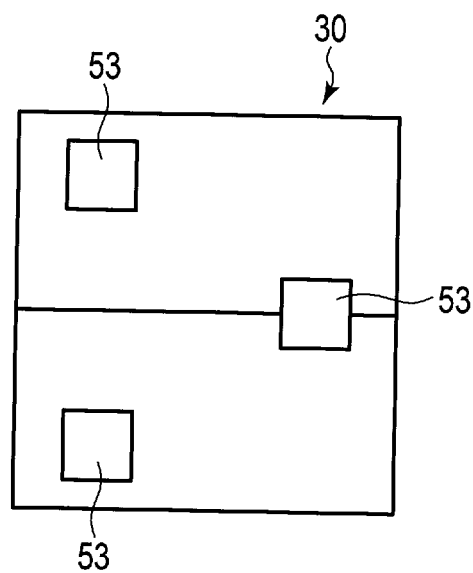
FIG. 4B is a view of a holder shown in FIG. 4A as viewed from an arrow 4B shown in FIG. 4A.
Figure 4C:
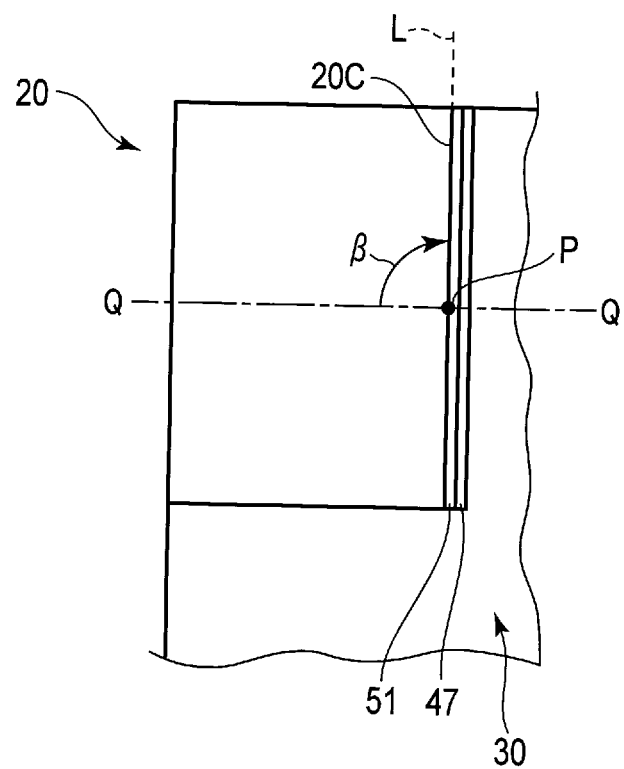
FIG. 4C is a view of the holder and an optical element shown in FIG. 4A as viewed from an arrow 4C shown in FIG. 4A.

Hereinafter, a third embodiment of the present invention will be described with reference to FIGS. 4A, 4B, and 4C.

In the present embodiment, only differences from the first embodiment will be described.

Here, it is assumed that among surfaces of an optical element 20, a surface having a normal direction in which the optical performance most sensitively changes is defined as a first surface. A detector 50 detects, as the amount of positional deviation, an amount of inclination of at least the first surface. The detector 50 detects a translational movement amount of each of desired points on the first surface, and then detects an amount of inclination based on the detection result. The first surface indicates, for example, a reflector 51. Specifically, the first surface indicates an inclined surface 20c on which the reflector 51 is disposed. The detector 50 measures the amount of inclination of the reflector 51 with three different points on the reflector 51. The length measurement with three points allows accurately detecting the inclination three-dimensionally. For this reason, in the present embodiment, for example, three sensor heads 53 are arranged. If the three sensor heads 53 are aligned on the same straight line, it is difficult to detect an inclination about the straight line. Therefore, as shown in FIG. 4B, it is preferable that the three sensor heads 53 be not aligned on the same straight line. In this way, the points for detection consist of three points, and these three points are not aligned on the same straight line.

It is preferable to detect the inclination at three points in consideration of costs, detection accuracy, etc.; however, the detection is not limited thereto. For example, the detection may be performed at two points, which has advantages such as low cost. For example, the detection may be performed at four points, which has advantages such as an improvement in detection accuracy.

The discrimination unit 71 discriminates whether the light radiating device 10 is in normal state, the first abnormal state, or the second abnormal state, based on the amount of inclination detected by the detector 50 and the threshold preset in advance.

The optical performance in the first abnormal state is substantially equal to the optical performance in the normal state. The first abnormal state is a state where a change in the amount of inclination occurs with respect to the amount of inclination in the normal state.

The optical performance in the second abnormal state is lower than the optical performance in the first abnormal state. In the second abnormal state, the amount of inclination in the second abnormal state relative to the amount of inclination in the normal state is more than the amount of inclination in the first abnormal state relative to the amount of inclination in the normal state.

The threshold for the amount of inclination includes a first threshold and a second threshold that is a value greater than the first threshold. The thresholds are preliminarily stored in the storage 73. When the discrimination unit 71 is composed of a processor, the thresholds may be stored in the above-mentioned internal memory or the above-mentioned external memory (not shown) accessible by the processor. The first threshold may be set, for example, as a measurement lower limit value of the detector 50 or as a value obtained by adding a measurement tolerance to the measurement lower limit value. The first and second thresholds may be input in the storage 73 from an input unit (not shown) with desired values and at desired timings according to the usage condition of the light radiating device 10, the environment in which the light radiating device 10 is disposed, the apparatus or system in which the light radiating device 10 is disposed, etc.

For example, when receiving an amount of inclination as a detection result of the detector 50, the discrimination unit 71 accesses the storage 73 to read the threshold. Then, the discrimination unit 71 performs discrimination. When the amount of inclination is less than the first threshold, the discrimination unit 71 discriminates that the light radiating device 10 is in the normal state. When the amount of inclination is equal to or more than the first threshold and less than the second threshold, the discrimination unit 71 discriminates that the light radiating device 10 is in the first abnormal state. When the amount of inclination is equal to or more than the second threshold, the discrimination unit 71 discriminates that the light radiating device 10 is in the second abnormal state.

Here, an event in an abnormal state of the present embodiment in which positional deviation occurs as an inclination will be briefly described. In the present embodiment, the emission position of outgoing light in the optical element 20 changes in proportion to the amount of inclination. This change means that the emission position in an abnormal state deviates relative to the emission position in the normal state.

Therefore, an event in the abnormal state of the present embodiment is the same as the event in the abnormal state of the first embodiment described in the first embodiment. The reason why the reflector 51 as a one-surface reflective prism can be said to be the first surface is that the reflector 51 is a surface in which the optical performance most sensitively changes by virtue of each of the second threshold of Example 1 and Example 2 described in the first embodiment.

For example, the discrimination unit 71 discriminates amounts of inclination in respective directions of inclination of the reflector 51. The discrimination unit 71 discriminates, for example, directions of two inclinations α and β relative to two tangents orthogonal to the normal line and orthogonal to each other. The α direction and the β direction will be described with reference to FIGS. 4A and 4C. In the normal state, a reflection position of the reflector 51 that reflects light traveling inside the optical element 20 toward the reflector 51 is referred to as a "point P". In the normal state, the normal line of the reflector 51 passing through the point P is referred to as a "normal line Q-Q". The α direction is a direction in which the light travels from the normal line Q-Q toward the reflector 51 at an angle between the normal line Q-Q and the reflector 51, on the sides of the optical element 20 and the light emitting unit 75. When this angle is approximately 90 degrees, the state is normal. In the normal state, a straight line passing the normal line Q-Q and the point P and being perpendicular to the paper surface of FIG. 4A is referred to as a "straight line L". In the normal state, the straight line L is a straight line orthogonal to a plane including light traveling from the light emitting unit 75 to the point P and light traveling from the point P to an object 5. The β direction is a direction from the normal line Q-Q toward the straight line L at an angle between the normal line Q-Q and the straight line L. When this angle is approximately 90 degrees, the state is normal.

When the amount of inclination in the α direction is less than the first threshold, and the amount of inclination in the β direction is less than the first threshold, the discrimination unit 71 discriminates that the light radiating device 10 is in the normal state.

When the amount of inclination in the α direction is equal to or more than the first threshold and less than the second threshold, and the amount of inclination in the β direction is less than the first threshold, the discrimination unit 71 discriminates that the light radiating device 10 is in the first abnormal state.

When the amount of inclination in the α direction is less than the first threshold, and the amount of inclination in the β direction is equal to or more than the first threshold and less than the second threshold, the discrimination unit 71 discriminates that the light radiating device 10 is in the first abnormal state.

When the amount of inclination in the α direction is equal to or more than the first threshold and less than the second threshold, and the amount of inclination in the β direction is equal to or more than the first threshold and less than the second threshold, the discrimination unit 71 discriminates that the light radiating device 10 is in the first abnormal state.

When the amount of inclination in the α direction is equal to or more than the second threshold, or the amount of inclination in the β direction is equal to or more than the second threshold, the discrimination unit 71 discriminates that the light radiating device 10 is in the second abnormal state.

The first threshold in the α direction may be the same as or different from the first threshold in the β direction. The second threshold in the α direction may be the same as or different from the second threshold in the β direction.

In the present embodiment, it is possible to easily detect without fail that the light radiating device 10 is in the first abnormal state. The present embodiment is effective when the contribution of the amount of inclination to the optical performance is higher than the contribution of the translational movement amount to the optical performance.

Fourth Embodiment

Figure 5A:
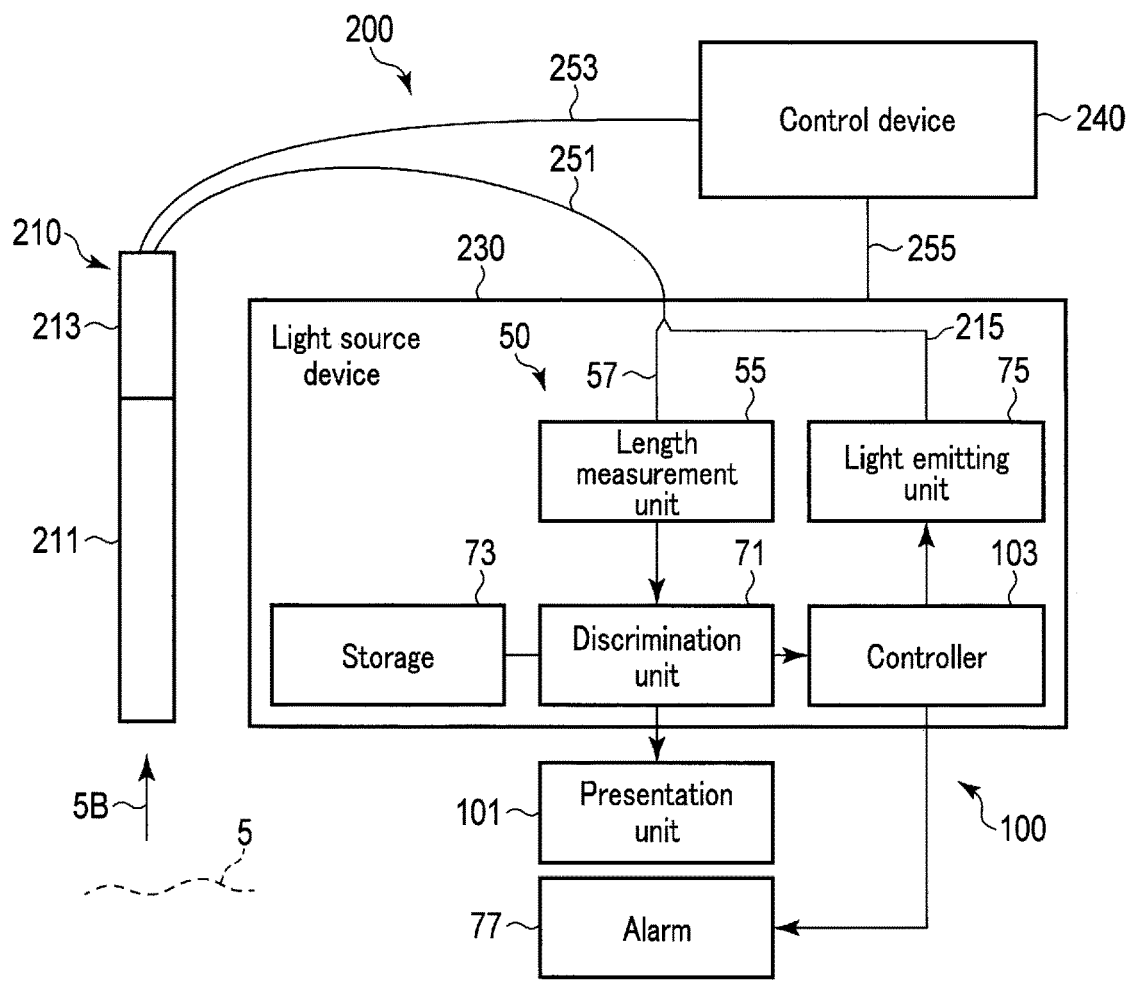
FIG. 5A shows a fourth embodiment of the present invention, and is a schematic view of an endoscope system including a light radiation system.
Figure 5B:
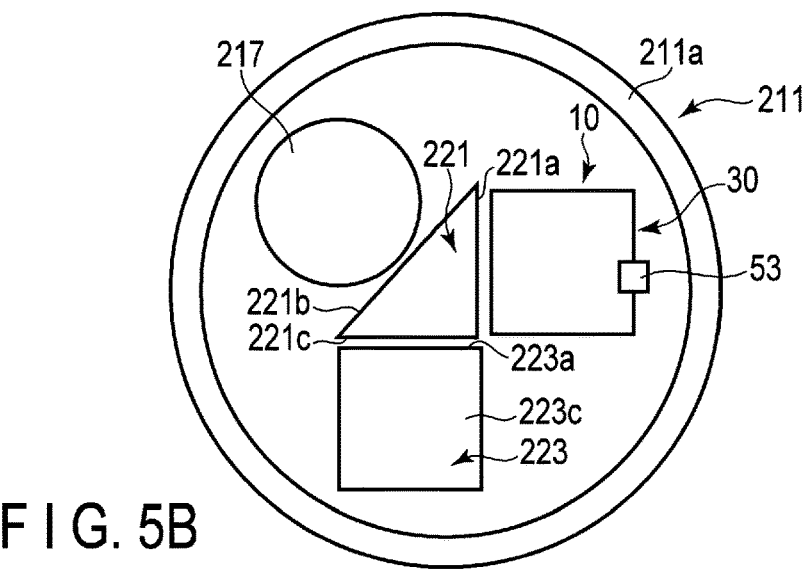
FIG. 5B is a view of an insertion section shown in FIG. 5A as viewed from an arrow 5B shown in FIG. 5A, and is a front view of a distal end section of the insertion section.
Figure 5C:
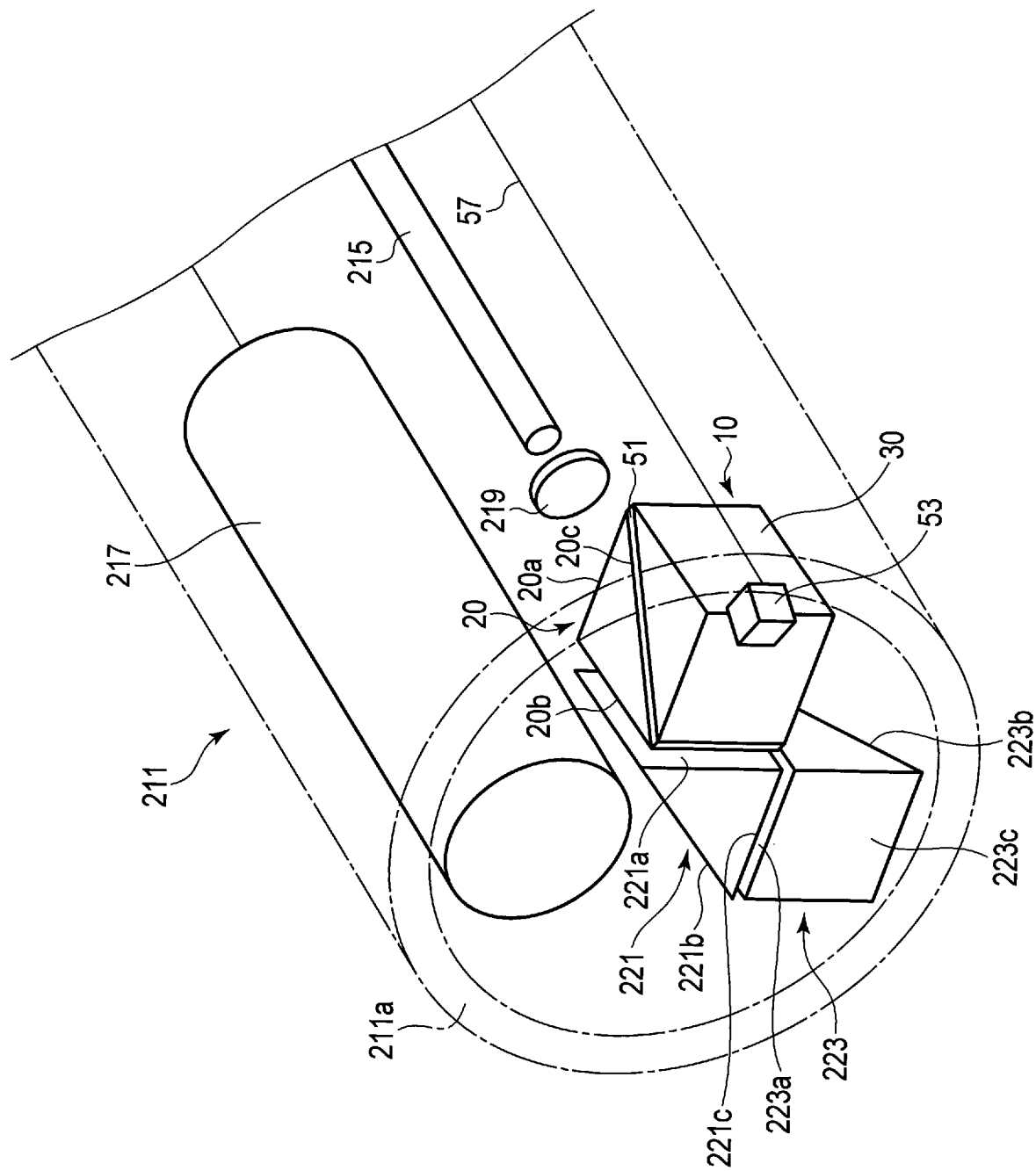
FIG. 5C is a schematic perspective view of the distal end section of the insertion section.

A fourth embodiment of the present invention will be described below with reference to FIGS. 5A, 5B, and 5C. In the present embodiment, only differences from the first embodiment will be described.

A light radiation system 100 including a light radiating device 10 can be mounted on various systems, and an object 5 differs depending on the system on which the light radiation system 100 is mounted. This system is, for example, an endoscope system 200 including an endoscope 210.

For example, when the light radiating device 10 is mounted on a medical endoscope system 200, an object 5 is a living tissue as an observation object. For example, when the light radiating device 10 is mounted on an industrial endoscope system 200, the object 5 is an internal space that is an observation object in an engine or the like. The endoscope 210 may be a soft endoscope or a rigid endoscope.

The endoscope system 200 includes an endoscope 210 and a light source device 230 connected to the endoscope 210 by a cable 251 and configured to emit light toward an optical element 20 disposed in the endoscope 210. The endoscope system 200 includes a control device 240 connected to the endoscope 210 by a cable 253 and connected to the light source device 230 by a cable 255. The control device 240 controls the endoscope 210 and the light source device 230.

The endoscope 210 of the present embodiment is, for example, a rigid endoscope used for surgery. The endoscope 210 includes an elongated cylindrical insertion section 211 that is a rigid portion and to be inserted into an observation object, and a control section 213 connected to the proximal end portion of the insertion section 211 and configured to control the endoscope 210.

The endoscope 210 includes a light guide 215 disposed inside the endoscope 210 and inside the cable 251. The distal end section of the light guide 215 is disposed at the distal end section of the insertion section 211. The proximal end of the light guide 215 is optically connected to a light emitting unit 75 disposed in the light source device 230. The light guide 215 guides light emitted from the light emitting unit 75 to the optical element 20 disposed at the distal end section of the insertion section 211. The light guide 215 includes, for example, an optical fiber.

The insertion section 211 includes, in the inside thereof, a holder 30 having the optical element 20, a reflector 51, and a sensor head 53; an imaging unit 217 having a CCD, etc.; a condenser 219; a first prism 221, and a second prism 223. The entire length of the insertion section 211 including the holder 30, the imaging unit 217, the condenser 219, the first prism 221, and the second prism 223 is covered by an outer peripheral portion 211a of the insertion section 211, made of resin, etc., and is positioned by being fixedly held relative to the outer peripheral portion 211a. The holder 30, the CCD, the condenser 219, the first prism 221, and the second prism 223 are arranged at the distal end section of the insertion section 211.

The condenser 219 is disposed between the distal end section of the light guide 215 and a first side surface 20a of the optical element 20 in the central axis direction of the insertion section 211. The condenser 219 converges light emitted from the distal end section of the light guide 215 on the optical element 20. The condenser 219 includes a lens, for example. The distal end section of the light guide 215 and the condenser 219 are positioned and fixed to the holder 30 and positioned relatively to the optical element 20. The distal end section of the light guide 215 and the condenser 219 are optically connected to the optical element 20.

In the present embodiment, the optical element 20 emits outgoing light toward the first prism 221.

The first prism 221 has, for example, a triangular prism shape. The first prism 221 is disposed between a second side surface 20b of the optical element 20 and the outer peripheral portion 211a of the insertion section 211 in the planar direction of the distal end surface of the insertion section 211 and so as to face the second side surface 20b. The first prism 221 includes a first entrance surface 221a that outgoing light emitted from the second side surface 20b toward the first prism 221 enters; a first reflector 221b that reflects the light that has entered the first prism 221 toward the second prism 223; and a first emission surface 221c that emits the light reflected by the first reflector 221b toward the second prism 223. The first entrance surface 221a corresponds to the first side surface 20a and faces the second side surface 20b. The first emission surface 221c corresponds to the second side surface 20b, and the first reflector 221b corresponds to the reflector 51. The first prism 221 reflects the light that has entered the first prism 221 from the optical element 20 toward the second prism 223 by 90 degrees. With this configuration, light is emitted from the first prism 221 toward the second prism 223, travels in the planar direction, and enters the second prism 223.

The second prism 223 has, for example, a triangular prism shape. The second prism 223 is disposed between the first emission surface 221c and the outer peripheral portion 211a of the first prism 221 in the planar direction of the distal end section of the insertion section 211 and so as to face the first emission surface 221c. The second prism 223 includes a second entrance surface 223a that outgoing light emitted from the first emission surface 221c toward the second prism 223 enters; a second reflector 223b that reflects the light that has entered the second prism 223 toward the outside of the insertion section 211 in the central axis direction of the insertion section 211; and a second emission surface 223c from which the light reflected by the second reflector 223b is emitted as illumination light toward the outside. The second entrance surface 223a corresponds to the first side surface 20a and faces the first emission surface 221c. The second emission surface 223c corresponds to the second side surface 20b, and the second reflector 223b corresponds to the reflector 51. The second prism 223 reflects the light that has entered the second prism 223 from the first prism 221 toward the outside by 90 degrees. Accordingly, light is emitted from the second prism 223 toward the outside. The outside indicates the front of distal end section of the insertion section 211, and indicates the opposite side to a portion where the light guide 215 and the light emitting unit 75 are arranged.

In the present embodiment, it suffices that outgoing light emitted from the optical element 20 can be emitted as illumination light to the outside, and so any light member other than the first and second prisms may be used.

The light emitted from the second prism 223 is diffused by a diffusing member (not shown), and then emitted to the outside from an illumination window (not shown) provided on a flat surface of the distal end section of the insertion section 211. The diffusion referred to herein includes, for example, refraction, diffraction, and scattering, and the number of directions in which diffused light travels increases to two or more by diffusion. Therefore, the illumination range of the illumination light emitted to the outside is expanded. The diffusing member is disposed on the front side relative to the second prism 223 (the second emission surface 223c) inside the distal end section of the insertion section 211. The front side indicates the side opposite to the light guide 215. Therefore, the diffusing member faces the second emission surface 223c in the central axis direction of the insertion section 211. The member having the above function is not limited to a diffusing member. For example, another optical element or optical member, such as a fluorescent member, may be disposed instead.

The light source device 230 includes a length measurement unit 55, a discrimination unit 71, a storage 73, a light emitting unit 75, and a controller 103. The light emitting unit 75 is optically connected to the optical element 20 through the light guide 215.

The control device 240 has a function of synchronizing the light source 230 with the control device 240. The control device 240 may function as a video processor having an image processing circuit (not shown) electrically connected to an imaging unit 217. The imaging unit 217 converts, to an electrical signal, an optical image obtained from the reflected light obtained that has been emitted from the distal end section of the insertion section 211 and then reflected by the object 5. The imaging unit 217 outputs the electrical signal to the image processing circuit. The image processing circuit generates an image signal of the object 5 based on the electrical signal. This image signal may be displayed as an observation image on a monitor in the presentation unit 101. In other words, a monitor included in the endoscope system 200 may function as the presentation unit 101 to display the discrimination result. Although not shown, this image signal may be displayed as an observation image on a display of the endoscope system 200, which is a monitor different from the presentation unit 101.

In the present embodiment, the light radiation system 100 can be incorporated into the endoscope system 200.

Fifth Embodiment

A fifth embodiment of the present invention will be described below with reference to FIGS. 6A and 6B. In the present embodiment, only differences from the first embodiment will be described.

A light radiation system 100 including the light radiating device 10 may be mounted on, for example, a microscope. This microscope may be a laser scanning microscope 300 shown in FIG. 6A or a transmission optical microscope 400 shown in FIG. 6B. In these cases, an object 5 is an integrated circuit or a microorganism, which is an observation object.

The laser scanning microscope 300 shown in FIG. 6A including the light radiation system 100 includes a collimating unit 301, which is a lens configured to convert outgoing light emitted from the light radiating device 10 into parallel light; a first light deflector 303 configured to deflect the parallel light in a Y direction to scan the parallel light over the object 5 in the Y direction; and a second light deflector 305 configured to deflect parallel light in an X direction orthogonal to the Y direction to scan the parallel light over the object 5 in the X direction. The laser scanning microscope 300 includes a reflector 307, which is a mirror, configured to reflect the light deflected by the second light deflector 305, and an objective lens 309 configured to light reflected by the reflector 307 onto the object 5. It should be noted that, a one-surface reflective prism may be disposed instead of the mirror of the reflector 307. The outgoing light emitted from the light radiating device 10 travels in the order of the collimating unit 301, the first light deflector 303, the second light deflector 305, the reflector 307, and the objective lens 309, and then reaches the object 5 mounted on a stage (not shown). The light radiated to the object 5 is reflected by the object 5, and then travels in the order of the objective lens 309, the reflector 51, the second light deflector 305, and the first light deflector 303.

The laser scanning microscope 300 includes a beam splitter 311 disposed between the first light deflector 303 and the collimating unit 301 and configured to transmit light traveling toward the object 5 and reflect return light returning from the object 5. The laser scanning microscope 300 includes a pinhole 313 having a hole 313a through which at least a part of the light reflected by the beam splitter 311 passes, and a detector 315 configured to detect the light that has passed through the hole 313a. The detector 315 includes, for example, a photodiode. The light returning from the first light deflector 303 is reflected by the beam splitter 311, passes through the hole 313a, and travels to the detector 315.

Thus, the light radiation system 100 can be incorporated into the laser scanning microscope 300.

The laser scanning microscope 300 may be connected to the presentation unit 101, and the presentation unit 101 may display an image observed by the laser scanning microscope 300, together with the discrimination result. In other words, a monitor included in the laser scanning microscope 300 may function as the presentation unit 101 to display the discrimination result.

The transmission optical microscope 400 shown in FIG. 6B including the light radiation system 100 includes an ocular lens 401, and a microscope body 405 having an observation lens barrel 403 on which the ocular lens 401 is detachably mounted. The microscope body 405 includes a revolver 407 configured to rotate and support objective lenses 409. The magnifications of the respective objective lenses 409 differ from one another. The objective lens 409 used for observation is switched by the rotation of the revolver 407 and is disposed above the object 5. In other words, the object 5 is disposed below the objective lens 409 on an optical axis of a single objective lens 409 used for observation. The object 5 is placed on the stage 413, and the stage 413 is supported by a stage receiver 415 so as to be moved in the X and Y directions that are parallel directions of the stage 413. The stage receiver 415 is supported by the microscope body 405 so as to be moved in the vertical direction, i.e., in a Z direction, by the rotation of a Z handle 417.

The optical element 20 and the holder 30 of the light radiating device 10 in the modification 1 of the first embodiment are arranged on the optical axis and below the stage receiver 415. The optical element 20 as a fluorescent substance and the holder 30 are supported at the bottom of the microscope body 405 through a column support 419. Light (e.g., fluorescence) emitted from the light radiating device 10 illuminates the object 5 from the lower side of the object 5. The user observes a magnified image of the object 5 through the ocular lens 401 and the objective lens 309.

In this way, the light radiation system 100 can be incorporated into the transmission optical microscope 400.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light radiating device comprising:
   an optical element held at a desired position by a holder and configured to exhibit desired optical performance based on incoming light entered at the desired position; and
   a processor comprising hardware, the processor being configured to:
      receive a signal indicating detection of an amount of positional deviation of the optical element relative to the desired position; and
      discriminate whether the light radiating device is in a normal state or an abnormal state based on the detected amount of positional deviation, the normal state being a state where the optical element exhibits the desired optical performance by being disposed at the desired position, and the abnormal state being a first abnormal state or a second abnormal state where the optical element is disposed at a position deviating from the desired position, the first abnormal state being an intermediate state between the normal state and the second abnormal state, and being a state that exists while the light radiating device transits from the normal state to the second abnormal state.

2. The light radiating device according to claim 1, wherein the processor detects, as the amount of positional deviation, a translation movement amount in a first direction among directions defined by a surface of the optical element.

3. The light radiating device according to claim 2, wherein the first direction is a direction in which the optical performance most sensitively changes as compared with the directions other than the first direction.

4. The light radiating device according to claim 3, wherein the processor discriminates whether the light radiating device is in the normal state, the first abnormal state, or the second abnormal state, based on the amount of positional deviation detected by the processor and a preset threshold.

5. The light radiating device according to claim 4, wherein the optical performance of the optical element in the first abnormal state is substantially equal to the optical performance of the optical element in the normal state, and the first abnormal state is a state where positional deviation of the optical element occurs with respect to the arrangement position of the optical element in the normal state,
the optical performance of the optical element in the second abnormal state is lower than the optical performance of the optical element in the first abnormal state, and the second abnormal state is a state where an amount of positional deviation of the optical element in the second abnormal state with respect to the arrangement position of the optical element in the normal state is more than an amount of positional deviation of the optical element in the first abnormal state with respect to the arrangement position of the optical element in the normal state,
the threshold includes a first threshold and a second threshold that is a value greater than the first threshold,
when the amount of positional deviation detected by the processor is less than the first threshold, the processor unit discriminates that the light radiating device is in the normal state, and
when the amount of positional deviation detected by the processor is equal to or more than the first threshold and less than the second threshold, the processor discriminates that the light radiating device is in the first abnormal state.

6. The light radiating device according to claim 5, wherein when the amount of positional deviation is equal to or more than the second threshold, the processor discriminates that the light radiating device is in the second abnormal state.

7. The light radiating device according to claim 1, wherein the processor detects, as the amount of positional deviation, a translational movement amount in respective directions among directions defined by a surface of the optical element.

8. The light radiating device according to claim 7, wherein
the directions include a first direction and a second direction that is a direction other than the first direction, and
the first direction is a direction in which the optical performance most sensitively changes as compared with the directions other than the first direction.

9. The light radiating device according to claim 8, wherein
the abnormal state includes a first abnormal state and a second abnormal state,
the first abnormal state is an intermediate state between the normal state and the second abnormal state, and is a state that exists while the light radiating device transits from the normal state to the second abnormal state, and
the processor discriminates whether the light radiating device is in the normal state, the first abnormal state, or the second abnormal state, based on the amount of positional deviation detected by the processor and a preset threshold.

10. The light radiating device according to claim 9, wherein the optical performance of the optical element in the first abnormal state is substantially equal to the optical performance of the optical element in the normal state, and the first abnormal state is a state where positional deviation of the optical element in the first direction occurs with respect to the arrangement position of the optical element in the normal state,
the optical performance of the optical element in the second abnormal state is lower than the optical performance of the optical element in the first abnormal state, and the second abnormal state is a state where an amount of positional deviation in the first direction of the optical element in the second abnormal state with respect to the arrangement position of the optical element in the normal state is more than an amount of positional deviation in the first direction of the optical element in the first abnormal state with respect to the arrangement position of the optical element in the normal state,
the threshold includes a first threshold and a second threshold related to the first direction, the second threshold being a value greater than the first threshold, and a third threshold related to the second direction,
when the amount of positional deviation in the first direction is less than the first threshold, and the amount of positional deviation in the second direction is less than the third threshold, the processor discriminates that the light radiating device is in the normal state, and
when the amount of positional deviation in the first direction is equal to or more than the first threshold and less than the second threshold, or when the amount of positional deviation in the first direction is less than the first threshold and the amount of positional deviation in the second direction is equal to or more than the third threshold, the processor discriminates that the light radiating device is in the first abnormal state.

11. The light radiating device according to claim 10, wherein
when the amount of positional deviation in the first direction is equal to or more than the second threshold, the processor discriminates that the light radiating device is in the second abnormal state.

12. The light radiating device according to claim 1, wherein
when among surfaces of the optical element, a surface having a normal direction in which the optical performance most sensitively changes is defined as a first surface, the processor detects, as the amount of positional deviation, an amount of inclination of at least the first surface.

13. The light radiating device according to claim 12, wherein
the processor detects a translational movement amount of each of desired points on the first surface to detect the amount of inclination based on a detection result.

14. The light radiating device according to claim 13, wherein
the points consist of three points, and the three points are not aligned on the same straight line.

15. The light radiating device according to claim 12, wherein
the abnormal state includes a first abnormal state and a second abnormal state,
the first abnormal state is an intermediate state between the normal state and the second abnormal state, and is a state that exists while the light radiating device transits from the normal state to the second abnormal state, and the processor discriminates whether the light radiating device is in the normal state, the first abnormal state, or the second abnormal state, based on the amount of inclination detected by the processor and a preset threshold.

16. The light radiating device according to claim 15, wherein the optical performance of the optical element in the first abnormal state is substantially equal to the optical performance of the optical element in the normal state, and the first abnormal state is a state where a change in the amount of inclination occurs with respect to the amount of inclination of the first surface of the optical element in the normal state, the optical performance of the optical element in the second abnormal state is lower than that in the first abnormal state, and the second abnormal state is a state where the amount of inclination of the first surface of the optical element in the second abnormal state relative to the amount of inclination of the first surface of the optical element in the normal state is more than the amount of inclination of the first surface of the optical element in the second abnormal state relative to the amount of inclination of the first surface of the optical element in the normal state, the threshold includes a first threshold and a second threshold that is a value greater than the first threshold, when the amount of inclination is less than the first threshold, the processor discriminates that the light radiating device is in the normal state, and when the amount of inclination is equal to or more than the first threshold and less than the second threshold, the processor discriminates that the light radiating device is in the first abnormal state.

17. The light radiating device according to claim 16, wherein when the amount of inclination is equal to or more than the second threshold, the processor discriminates that the light radiating device is in the second abnormal state.

18. The light radiating device according to claim 1, wherein the abnormal state includes a first abnormal state and a second abnormal state, the first abnormal state is an intermediate state between the normal state and the second abnormal state, and is a state that exists while the light radiating device transits from the normal state to the second abnormal state, and the processor discriminates whether the light radiating device is in the normal state, the first abnormal state, or the second abnormal state, based on the amount of positional deviation detected by the processor and a preset threshold.

19. The light radiating device according to claim 18, wherein the optical performance of the optical element in the first abnormal state is substantially equal to the optical performance of the optical element in the normal state, and the first abnormal state is a state where positional deviation of the optical element occurs with respect to the arrangement position of the optical element in the normal state, and the optical performance of the optical element in the second abnormal state is lower than the optical performance of the optical element in the first abnormal state, and the second abnormal state is a state where an amount of positional deviation of the optical element in the second abnormal state with respect to the arrangement position of the optical element in the normal state is more than an amount of positional deviation of the optical element in the first abnormal state with respect to the arrangement position of the optical element in the normal state.

20. The light radiating device according to claim 1, wherein the optical performance includes any one of an emission position of outgoing light emitted from the optical element, an emission direction of the outgoing light, a light distribution of the outgoing light, emission efficiency of the outgoing light, color unevenness of the outgoing light, a speckle noise of the outgoing light, an optical spectrum of the outgoing light, scattering efficiency of the outgoing light, refractive index characteristics, and diffraction characteristics.

* * * * *